US012761645B2

(12) United States Patent
Halbe et al.

(10) Patent No.: US 12,761,645 B2
(45) Date of Patent: Oct. 13, 2026

(54) SYSTEMS AND METHODS FOR DETERMINING REMAINING USEFUL LIFE OF AN IGNITOR

(71) Applicant: Cummins Power Generation Inc., Minneapolis, MN (US)

(72) Inventors: Mayura H. Halbe, Columbus, IN (US); Daniel J. O'Connor, Columbus, IN (US); Alan C. Anderson, Columbus, IN (US); Sachin Joshi, Columbus, IN (US); William Marshall Cover, Columbus, IN (US); Luke Thomas Jennings, Columbus, IN (US); Pagalavan Mathari Bakthavatsalam, Columbus, IN (US); Nidhi Sakhala, Columbus, IN (US); John Howland, Columbus, IN (US); Michael T. Hughes, Columbus, IN (US); David E. Charles, Columbus, IN (US)

(73) Assignee: Cummins Power Generation Inc., Minneapolis, MN (US)

( * ) Notice: Subject to any disclaimer, the term of this patent is extended or adjusted under 35 U.S.C. 154(b) by 299 days.

(21) Appl. No.: 18/415,458

(22) Filed: Jan. 17, 2024

(65) Prior Publication Data

US 2024/0255940 A1 Aug. 1, 2024

Related U.S. Application Data

(60) Provisional application No. 63/442,040, filed on Jan. 30, 2023.

(51) Int. Cl.
*G05B 23/02* (2006.01)
*F02D 41/22* (2006.01)

(52) U.S. Cl.
CPC ....... *G05B 23/0283* (2013.01); *F02D 41/222* (2013.01)

(58) Field of Classification Search
CPC . G05B 23/0283; F02D 41/222; F02D 35/023; F02D 41/1445; F02D 41/1446;
(Continued)

(56) References Cited

U.S. PATENT DOCUMENTS

| | | | |
|---|---|---|---|
| 6,512,375 | B1 | 1/2003 | Yamada et al. |
| 6,876,908 | B2 | 4/2005 | Cramer et al. |

(Continued)

FOREIGN PATENT DOCUMENTS

| | | | |
|---|---|---|---|
| EP | 1 835 172 | A3 | 9/2007 |
| WO | WO-2007/046270 | A1 | 4/2007 |

(Continued)

OTHER PUBLICATIONS

Extended European Search Report on EP Appl. Ser. No. 24154018.6 Dated Dec. 23, 2024 (10 pages).

(Continued)

*Primary Examiner* — Daryl C Pope
(74) *Attorney, Agent, or Firm* — Foley & Lardner LLP

(57) ABSTRACT

Systems and methods for determining a remaining useful life (RUL) of a component of an engine system are provided. A method includes: receiving component data comprising sensor data corresponding to a component and engine data; pre-processing the component data by removing a first set of sensor data values that correspond to a first set of engine data values of the engine data; aggregating the pre-processed component data by grouping a second set of sensor values of the sensor data; determining a RUL for the component based on a RUL model that correlates at least a portion of the aggregated data to RUL values; adjusting the RUL based on at least one of detecting a service event or determining that
(Continued)

one or more sensor data values of the sensor data are outside a predetermined range of values; and providing the RUL to a user device.

17 Claims, 4 Drawing Sheets

(58) Field of Classification Search
CPC ......... F02D 2200/021; F02D 2200/023; F02D 2200/101; F02D 41/22; F02P 17/12; F02P 2017/121
See application file for complete search history.

(56) References Cited

U.S. PATENT DOCUMENTS

| | | | |
|---|---|---|---|
| 7,124,019 B2 | 10/2006 | Goodell et al. | |
| 7,286,916 B2 | 10/2007 | Hoeflacher et al. | |
| 7,457,785 B1 | 11/2008 | Greitzer et al. | |
| 7,650,210 B2 | 1/2010 | Breed | |
| 7,706,938 B2 | 4/2010 | Palladino | |
| 7,886,983 B2 | 2/2011 | Criss et al. | |
| 8,036,788 B2 | 10/2011 | Breed | |
| 8,165,826 B2 | 4/2012 | Schimert et al. | |
| 9,080,509 B2 | 7/2015 | Huberts et al. | |
| 9,127,638 B2 | 9/2015 | Shibata et al. | |
| 9,430,882 B2 | 8/2016 | Ho | |
| 9,683,535 B2 | 6/2017 | Glugla et al. | |
| 9,835,128 B2 | 12/2017 | Huberts et al. | |
| 10,012,205 B2 | 7/2018 | Campagna et al. | |
| 10,054,101 B2 | 8/2018 | Glugla et al. | |
| 10,444,747 B2 | 10/2019 | Keene et al. | |
| 10,544,773 B2 | 1/2020 | Hoban et al. | |
| 10,814,883 B1 | 10/2020 | Dixit | |
| 10,890,156 B2 | 1/2021 | Wustenhagen et al. | |
| 10,900,461 B2 | 1/2021 | Huberts et al. | |
| 10,995,726 B2 | 5/2021 | Petruska et al. | |
| 11,015,568 B2 | 5/2021 | Shah | |
| 11,176,762 B2 | 11/2021 | Davidson | |
| 11,182,987 B2 | 11/2021 | Davidson | |
| 2002/0143421 A1 | 10/2002 | Wetzer | |
| 2006/0241886 A1* | 10/2006 | Ponziani | F02C 7/266 702/113 |
| 2014/0163936 A1 | 6/2014 | Hosking et al. | |
| 2016/0078695 A1 | 3/2016 | Mcclintic et al. | |
| 2017/0309094 A1 | 10/2017 | Farahat et al. | |
| 2018/0100479 A1 | 4/2018 | Shah et al. | |
| 2019/0266295 A1 | 8/2019 | Masuda et al. | |
| 2019/0271978 A1 | 9/2019 | Elbsat et al. | |
| 2020/0057689 A1 | 2/2020 | Farahat et al. | |
| 2020/0096985 A1 | 3/2020 | Wenzel et al. | |
| 2020/0104730 A1 | 4/2020 | Strong | |
| 2020/0301408 A1 | 9/2020 | Elbsat et al. | |
| 2020/0356087 A1 | 11/2020 | Elbsat et al. | |
| 2021/0072742 A1 | 3/2021 | Wu et al. | |
| 2021/0332783 A1 | 10/2021 | Hastall et al. | |
| 2022/0068053 A1 | 3/2022 | Hinduja et al. | |
| 2022/0228548 A1 | 7/2022 | Shah | |
| 2022/0284278 A1 | 9/2022 | Tang et al. | |
| 2023/0123527 A1 | 4/2023 | Michael et al. | |

FOREIGN PATENT DOCUMENTS

| | | |
|---|---|---|
| WO | WO-2009/116303 A1 | 9/2009 |
| WO | WO-2019/171337 A1 | 9/2019 |
| WO | WO-2022/072522 A1 | 4/2022 |
| WO | WO-2022/184318 A1 | 9/2022 |
| WO | WO-2024/063693 A1 | 3/2024 |

OTHER PUBLICATIONS

EPO Extended Search Report dtd Aug. 29, 24 re EPO Appl 24162175.4.

Adimulam, T., Bhoyar, M., & Reddy, P. (2019). Al-Driven Predictive Maintenance in IoT-Enabled Industrial Systems. Iconic Research and Engineering Journals, 2(11), 398-410. (Year: 2019).

Non-Final Office Action on U.S. Appl. No. 18/595,977 Dtd Oct. 17, 2025.

Final Office Action on U.S. Appl. No. 18/595,977 Dtd Mar. 4, 2026.

Li, J., Li, X., & He, D. (2019). A directed acyclic graph network combined with CNN and LSTM for remaining useful life prediction. IEEE Access, 7, 75464-75475. (Year: 2019).

Non-Final Office Action on U.S. Appl. No. 18/595,977 dated Jul. 15, 2026 (28 pages).

* cited by examiner

SYSTEMS AND METHODS FOR DETERMINING REMAINING USEFUL LIFE OF AN IGNITOR

CROSS-REFERENCE TO RELATED APPLICATION

This U.S. Non-Provisional Patent Application claims the benefit of and priority to U.S. Provisional Application No. 63/442,040, filed Jan. 30, 2023, which is incorporated herein by reference in its entirety.

TECHNICAL FIELD

The present disclosure relates to spark ignited engine systems. More particularly, the present disclosure relates to systems and methods for determining remaining useful life of an ignition assist device, such as a spark plug, for spark ignited engine systems.

BACKGROUND

A spark ignited (SI) internal combustion engine (ICE) utilizes a spark plug or other ignition assist device to combust fuel to power a system (e.g., a vehicle, stationary equipment, etc.). The engine includes one or more engine cylinders for combusting the fuel and generating power. Each cylinder may include at least one ignition assist device, such as a spark plug, for igniting the fuel within the cylinder. Over time, the spark plug may degrade and require more electrical power to cause a spark. To mitigate spark plug degradation, the spark plug may be repaired and/or replaced based on, for example, an engine run time. However, each spark plug in an engine may not degrade at the same rate due to manufacturing differences and in-cylinder condition variability resulting from engine geometry among other parameters and operations conditions. Accordingly, repairing and/or replacing a spark plug based only on engine time may result in premature replacement or repair of otherwise healthy spark plugs.

SUMMARY

One embodiment relates to a method for determining a remaining useful life (RUL) of a component of an engine system. The method includes: receiving, by at least one processing circuit, component data comprising sensor data corresponding to the component and engine data corresponding to an engine of the engine system; pre-processing, by the at least one processing circuit, the component data by removing a first set of sensor data values of the sensor data that correspond to a first set of engine data values of the engine data; aggregating, by the at least one processing circuit, the pre-processed component data by grouping a second set of sensor values of the sensor data; determining, by the at least one processing circuit, a RUL for the component based on a RUL model that correlates at least a portion of the aggregated data to RUL values; adjusting, by the at least one processing circuit, the RUL based on at least one of detecting a service event or determining that one or more sensor data values of the sensor data are outside a predetermined range of values; and providing the RUL to a user device.

Another embodiment relates to a system. The system includes a controller coupled to an engine having one or more ignitors. The controller has one or more processors and one or more memory devices. The one or more memory devices store instructions that, when executed by the one or more processors, cause the controller to perform operations. The operations include receiving, from one or more sensors coupled to the controller, ignitor data regarding the one or more ignitors and engine data regarding the engine; pre-processing the ignitor data by removing a first set of ignitor data values of the ignitor data, the first set of ignitor data values corresponding to a first set of engine data values of the engine data; aggregating the pre-processed ignitor data by grouping a second set of ignitor data values of the ignitor data; determining a remaining useful life (RUL) value for each of the one or more ignitors based on the second set of ignitor data values and a model; and providing the RUL to a user device.

Another embodiment relates to a non-transitory computer readable media storing instructions that, when executed by one or more processors of a controller, cause the controller to perform operations. The operations include receiving engine data regarding operation of an engine; receiving an enable condition based on the engine data indicating that at least one engine data value of the engine data satisfies a corresponding threshold; receiving component data corresponding to a component of the engine, responsive to receiving the enable condition; pre-processing the component data by removing a first set of component data values of the component data that correspond to a first set of engine data values of the engine data; aggregating the pre-processed component data by grouping a second set of component values of the component data; determining a remaining useful life (RUL) for the component based on a RUL model that correlates at least a portion of the aggregated data to the RUL; and providing the RUL to a user device.

Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Figure 1:
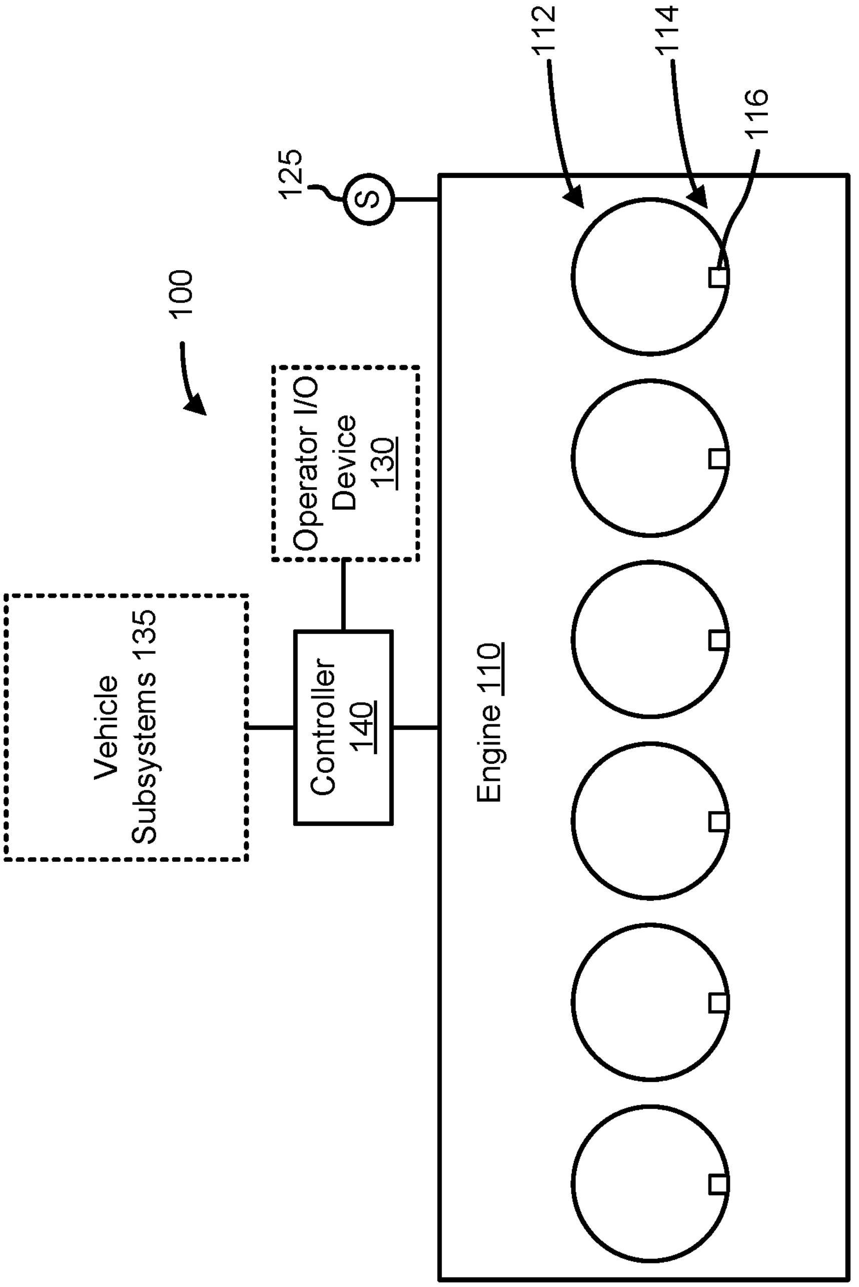
FIG. 1 is a schematic view of a block diagram of a vehicle system, according to an example embodiment.

Following below are more detailed descriptions of various concepts related to, and implementations of methods, apparatuses, and systems for determining remaining useful life of an ignition assist device and, particularly, a spark plug and a plurality of spark plugs for an engine system (a remaining useful life for each spark plug included in the engine system). The systems and methods described herein may be applicable to a variety of different spark-ignition system configurations, such as single coil ignition systems, dual coil ignition systems, three or other multi-coil ignition systems, and so on. In this way, a variety of different electrode configurations may be used by the systems and methods described herein (e.g., J-gap electrodes, multi-electrode configurations, etc.). Further, in some embodiments, multiple spark assist devices may be used with one or more of each combustion cylinder (e.g., two or more spark plugs per combustion cylinder). As described herein, the present disclosure relates to ignition systems implemented with spark-ignition internal combustion engines. Before turning to the Figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

As used herein, the terms "fire," "ignite," "strike," and similar terms refer to an ignition device, such as a spark plug, receiving an electrical charge (e.g., "ignition energy") and subsequently sparking or firing to enable combustion (not necessarily that combustion occurs, but that a firing has occurred to enable or promote combustion in various operating conditions). In the spark plug configuration, the "spark" refers to an electrical current that is formed between two electrodes separated by an air gap when the spark plug receives the ignition energy. A "firing event" may include providing a command to an ignition device to generate a spark that causes the providing of ignition energy to the ignition device thereby causing the spark. The "ignition energy" refers to an amount of energy required to cause the ignition device to spark. The ignition energy may include a voltage component and/or a current component. For example, as described herein, a "breakdown voltage" refers to a voltage required to cause the ignition device to ignite.

As used herein, the term "predicting" and like terms are used to refer to determining a future value based on data (e.g., sensor data, historical sensor data, real-time sensor data, etc.). In some embodiments, predicting the future value may be performed using one or more models (e.g., statistical models, artificial intelligence models, machine learning models, etc.). For example, predicting a remaining useful life of an ignition device and, particularly, a spark plug may include using data, such as sensor data, with a model to determine a future breakdown voltage value.

As used herein, a "duty cycle" refers to a repeatable set of data, values, or information indicative of how a system, or, more specifically, a vehicle is being utilized for a particular application. In particular, a "duty cycle" refers to a repeatable set of vehicle operations for a particular event or for a predefined time period. For example, a "duty cycle" may refer a repeatable set of values indicative of an engine output (e.g., engine speed, engine torque, engine power) for a given time period. The values may include operational data and/or operational parameters. For example, the values may be indicative of the engine experiencing certain load conditions, such as being above or below a predefined low-load threshold value. In still another example, a "duty cycle" may refer to a time period values indicative of when the system or engine is being used compared to a time period when the system or engine is idling or off. Beneficially and based on the foregoing, the "duty cycle" may be representative of how a vehicle may operate in a particular setting, circumstance, and/or environment (e.g., a seventy-file mile stretch of a relatively flat freeway environment, a dirt or gravel road, a construction site, city streets, etc.). In this regard, the vehicle duty cycle may vary greatly based on the vehicle (e.g., a two-door sedan vehicle versus a concrete mixer truck versus a refuse truck, etc.). As an example, when an engine system is embodied in a vehicle (e.g., as a "prime mover"), a duty cycle may refer to an amount of time the engine system is providing power to move the vehicle versus the time that the engine is not providing power to move the vehicle or is at idle. Thus, it should be understood that a duty cycle may vary based on the use profile or application of the vehicle.

In yet another example, when an engine system is embodied in a stationary piece of equipment, such as power generation or generator set (i.e., "genset"), a duty cycle may refer to an amount of time the genset is providing power versus the time that the genset is not providing power, based upon demand. Further, in stationary applications, the duty cycle may refer to a magnitude of energy load demand on the genset at various times throughout the day, also based upon demand, and measured in watts, kilowatts, horsepower, or another unit of power. It should be understood that a duty cycle may vary based on the use profile or application of the genset. For example, in a prime power application, a genset may provide power at 80-90% load for up to 24 hours per day, while, in a standby application, a genset may only run during a grid outage.

Based on the foregoing and referring to the Figures generally, the various embodiments disclosed herein relate to systems, apparatuses, and methods for determining remaining useful life of an ignitor. The ignitor may include a spark plug, which includes an ignition coil (e.g., a spark coil) and/or a spark plug driver (e.g., an ignition coil, etc.). A controller (e.g., an engine control module (ECM), engine control unit (ECU), other electronic control unit or units, etc.) for a vehicle includes at least one processor and at least one memory storing instructions that, when executed by the processor, cause the controller to perform various operations. The operations include receiving data corresponding to an ignitor and aggregating the data to develop a model of a health of the ignitor. The model may correlate predicted breakdown voltage values with corresponding further time values. In turn, the controller may use the model to determine a time value corresponding to when the breakdown voltage exceeds a predetermined threshold. More specifically, the model may output the time value corresponding to when the predicted breakdown voltage exceeds a predetermined threshold. The determined time value corresponds to the remaining useful life of the ignitor. In some embodiments, the remaining useful life of the ignitor is determined by a remote computing system (e.g., a cloud computing system, etc.). In some embodiments, the remaining useful life of the ignitor is determined by an edge computing device coupled to the controller.

In any of the above-described embodiments, the health of each ignitor, and in particular, each spark plug of a spark ignited internal combustion engine may include or be based on a remaining useful life of the spark plug, which may provide an indication of a necessity for repair and/or replacement of the spark plug. The health of each spark plug may be provided to a remote computing system, such as a user device (e.g., local computer, laptop, tablet, smart phone, etc.) of a user (e.g., a customer, an operator of the engine system, an engineer, a service technician, etc.).

In some embodiments, a predicted remaining useful life of an ignitor (e.g., a spark plug) is determined based on an empirically derived relationship between engine operating duty cycle and ignition related operational data and/or operational parameters collected from a set of representative engines. In these embodiments, the prediction may be based on one or more vehicle systems providing data (e.g., sensor data, operational data, operational parameters, duty cycle information) at a predetermined transmission rate to a remote computing system (e.g., a cloud computing system), and using a model to generate the predicted remaining useful life.

Conventionally, ignitor replacement is based on engine hours (e.g., an amount of hours the engine has been operating since purchase, since production, since a last service event, etc.). However, a duty cycle of the engine may vary for different engine systems. In addition, degradation rates of each ignitor of the same engine may vary based on manufacturing differences, in-cylinder conditions because of engine geometry, combustion recipes (e.g., fuel type, air-to-fuel ratio), etc. As such, ignitors may be prematurely replaced (e.g., replaced before the end of a usable life) or replaced/repaired at a time significantly passed when required that may cause unwanted circumstances (e.g., damage to the engine, unwanted operating conditions such as exhaust conditions exceeding thresholds, etc.) with the engine hour driven strategies for ignitors. In addition, a set of ignitors on the same engine type (displacement volume) but operating with a different engine duty cycle variations (e.g., higher loads experienced for certain engine systems versus other systems) and in different operating environments (e.g., hot and dry environment versus a relatively cold environment, fuel quality, etc.), and/or other operating differences may also have different degradation rates from one engine/piece-of-equipment to another. For example, in a family of engines containing the same part number and/or type of ignitor, the spark plugs on one engine may degrade at a different rate than the spark plugs on the other engines depending on the application, ambient environment, and/or duty cycle.

Thus, a prognostic process as described herein which calculates or determines a remaining useful life (RUL) of each ignitor, and which provides advance notifications of ignitor health and/or time to maintenance may improve service capability for the service technicians, reduce unplanned downtime for vehicle/fleet operators, and/or reduce possibility of pre-mature change of spark plugs. In this regard, better systems and methods for predicting a health of ignition assist devices on spark-ignited engines are desired. Advantageously and as described herein, by determining the RUL of an ignitor, a total cost of ownership (e.g., of a vehicle or engine system having ignitors) may be reduced by decreasing unplanned maintenance events, increasing a time between maintenance intervals, and/or reducing a possibility of premature repair and/or replacement of ignitors. In particular and as described herein, the accuracy of a RUL prediction is improved by detecting changes in engine (e.g., in a vehicle or equipment) duty cycle, detecting or determining a service event (e.g., a repair or replacement of an ignitor), and/or using historical data in a model based on the service event.

The systems and methods described herein provide a technical solution to a technical problem of predicting the remaining useful life (RUL) of an ignitor, and in particular, a spark plug in dynamic environments, such as ever-changing internal combustion engine operating conditions (e.g., speed, load, etc.) and operating environments (e.g., high versus low humidity, high versus low temperature, etc.). More specifically, a technical problem may include the problem of accurately predicting the RUL as operating conditions of the engine are changing. The systems and methods described herein may advantageously reduce the amount of processing power required to generate a predicted RUL by training a model specific to a plurality of operating conditions thereby improving the applicability of the model with a variety of systems. For example, prior to training (or re-training) a model to predict future breakdown voltage values to determine the RUL of an ignitor, received data may be pre-processed and aggregated such that relevant data is used to build the model. As described in more detail herein, pre-processing data may include transforming data that is received in a non-standardized format into a standardized format and/or removing or filtering out data that corresponds to certain operating conditions, such as a low load operation of the engine or transient operations. The low load operation of the engine may not cause a high rate of spark plug degradation, and thus may have low impact in generating a predicted RUL value. The transient operations may correspond to periods of time when an engine output (e.g., speed, torque, etc.) and/or engine load are changing rapidly and/or by a large amount such that the changes result in temporary deviations of the inputs used by the RUL model (e.g., any of the data used herein to determine the breakdown voltage). Thus, the data which most significantly or likely most significantly impacts the RUL and data with good signal-to-noise ratio is provided as input to the model. As used herein, and in addition to the plain meaning of the word, "noise" refers to inaccuracies in data or other signals, which may be caused by load instability, intermittent, partial, or complete failure of neighboring sub-systems or components of the system 100, such as other ignitors, cylinders 112, fuel injectors, air handling systems, aftertreatment system components, etc., and/or other factors. By excluding data that does not significantly impact the RUL and "noisy" data, the accuracy of the RUL prediction and robustness to noise from neighboring sub-systems and equipment/vehicle operation is improved. As described in more detail herein, aggregating data may include grouping data values based on corresponding indicators (e.g., time stamps of sensor data), determining a representative value for a set of values (e.g., an average, a median, etc.), and/or determining a dynamic threshold of data aggregation based on engine operating conditions (e.g., duty cycle).

In some embodiments, the systems and methods described herein may use historical data in a model to generate a predicted RUL value. The predicted RUL value may be based on detecting and/or determining a service event. In particular, a technical problem may include the problem of accurately predicting the RUL of components (e.g., ignitors) that are repaired or replaced. For example, a model used to predict a RUL value may become less accurate subsequent to a service event because the data used to generate the model may have corresponded to a different component (in the case of a component replacement) or a different version of the component (in the case of a component repair). The systems and methods described herein may advantageously determine when a service event occurred and use data after the service event to train or re-train the model. That is, the service event is used as a cutoff or trigger for training a new model or re-training an existing model. As more time passes after the service event occurred, the systems and methods described herein gather more data regarding the operation of the component to improve the accuracy of the predicted RUL value. That is, by using a new model or a re-trained model, the amount of data transmissions to generate the predicted RUL value is increased which may be non-conventional as many systems and methods work to decrease the data transmission amount.

For example, it is not well-understood, routine, or conventional to increase the size (e.g., bandwidth) or frequency (e.g., number of transmissions) of data transmissions to generate predicted values. These and other features and benefits are described more fully herein below.

Referring now to FIG. 1, a schematic view of a block diagram of a system 100 is shown, according to an example embodiment. The system 100 includes an engine 110, an operator input/output (I/O) device 130, one or more vehicle subsystems 135, and a controller 140, where the controller 140 is communicably coupled to each of the aforementioned components. In the configuration of FIG. 1, the system 100 is included in a vehicle. The vehicle may be any type of on-road or off-road vehicle including, but not limited to, wheel-loaders, fork-lift trucks, line-haul trucks, mid-range trucks (e.g., pick-up truck, etc.), sedans, coupes, tanks, airplanes, boats, and any other type of vehicle. In another embodiment, the system 100 may be embodied in a stationary piece of equipment, such as a power generator or genset. All such variations are intended to fall within the scope of the present disclosure.

As shown, the engine 110 is a spark-ignition (SI) internal combustion engine (or simply "engine"). In some embodiments, the SI engine may use gasoline, propane, natural gas, hydrogen, and/or another fuel type to generate power. The engine 110 may include one or more cylinders 112. As shown in FIG. 1, the engine 110 includes six cylinders 112. However, it should be understood that the engine 110 may include more or fewer cylinders 112 (e.g., 4 cylinders, 8 cylinders, 12 cylinders, etc.). Further, the cylinders 112 may be arranged in any cylinder configuration (e.g., inline arrangement, V-arrangement, etc.). Each cylinder 112 may include an ignition system 114. The ignition systems 114 each include an ignition assist device or ignitor 116.

The ignitor 116 is configured to generate a spark. In some embodiments, the ignitor includes an electrode that is heated to a high temperature to ignite an air-fuel mixture in a cylinder 112. In some embodiments, the ignitor 116 includes a spark plug. The spark plug is a device for delivering electric current to the combustion chamber a cylinder 112 to ignite the air-fuel mixture by an electric spark. A spark plug may include a shell, electrically isolated from a central electrode by an insulator. The central electrode is connected to an ignition coil. The central electrode protrudes through the insulator and into the combustion chamber of the cylinder 112 thereby forming one or more spark gaps between an end of the central electrode at least one ground electrode that is coupled to and grounded by an inner end of the shell.

As shown, one or more sensors 125 are included in the system 100. The number, placement, and type of sensors included in the system 100 is shown for example purposes only. That is, in other configurations, the number, placement, and type of sensors may differ. For example, the sensors 125 may be located in or proximate the engine 110, upstream of the engine 110 and/or downstream of the engine 110. It should be understood that the location of the sensors may vary.

The sensors 125 may be engine sensors configured to detect and/or determine one or more parameters of the engine 110 (e.g., engine operational data), such as an engine torque, an engine power, an engine speed (e.g., in rotations per minute), an engine exhaust gas value (e.g., engine exhaust manifold pressure). For example, the sensors 125 may include a torque sensor configured to detect and/or determine an engine torque, a pressure sensor configured to detect and/or determine an exhaust manifold pressure, an engine mounted accelerometer or noise sensor configured to detect and/or determine engine knock, a cylinder pressure sensor configured to detect and/or determine a pressure within a cylinder, and/or a temperature sensors configured to detect and/or determine a temperature of the engine 110, exhaust gas output by the engine, etc. Additional sensors may be also included with the system 100. The sensors may include sensors associated with other components of the vehicle, such as the vehicle subsystems 135. For example, the sensors 125 may include a speed sensor of a turbo charger, a fuel quantity and injection rate sensor, a fuel rail pressure sensor, etc.).

In some embodiments, the sensors 125 may include one or more of a voltage sensor, a current sensor, or other sensor for measuring and/or determining a breakdown voltage. For example, a voltage sensor may be used to measure a voltage across an ignitor 116. The voltage across the ignitor 116 may correspond to the breakdown voltage.

In some embodiments, the sensors 125 may include a temperature sensors configured to detect and/or determine temperature data (e.g., fluid temperature such as exhaust gas temperature or engine oil temperature, component temperature such as engine temperature, etc.), a flow rate sensor configured to detect or determine flow rate data (e.g., exhaust gas flow rate data, charge air flow rate, etc.), a pressure sensor configured to detect or determine pressure data (e.g., engine cylinder pressure, coolant pressure, exhaust gas pressure, etc.), an engine sensor configured to detect and/or determine engine operational data (e.g., engine torque, engine speed, engine power, etc.), and/or other data related to the operation of the system 100, such as data indicative of a voltage breakdown of a ignitor 116.

The sensors 125 may be real or virtual (i.e., a non-physical sensor that is structured as program logic in the controller 140 that makes various estimations or determinations). For example, an engine speed sensor may be a real or virtual sensor arranged to measure or otherwise acquire data, values, or information indicative of a speed of the engine 110 (typically expressed in revolutions-per-minute). The sensor 125 is coupled to the engine (when structured as a real sensor), and is structured to send a signal to the controller 140 indicative of the speed of the engine 110. When structured as a virtual sensor, at least one input may be used by the controller 140 in an algorithm, model, lookup table, etc. to determine or estimate a parameter of the engine (e.g., power output, etc.). In another example, a fuel consumption sensors may be a real or virtual sensor configured to measure or otherwise acquire data, values, or information indicative of a fuel consumption rate (e.g., in miles per gallon, gallons per minute, etc.) of the engine 110. The sensor 125 is coupled to the engine (when structured as a real sensor), and is structured to send a signal to the controller 140 indicative of a fuel consumption rate of the engine (e.g., by measuring an amount of fuel injected into the engine per unit distance travelled by the system 100 and/or per unit time). When structured as a virtual sensor, at least one input may be used by the controller 140 in an algorithm, model, lookup table, etc. to determine or estimate a parameter of the engine (e.g., fuel consumption, etc.). Any of the sensors 125 described herein may be real or virtual.

According to various example embodiments, the sensors 125 are configured to detect and/or determine a breakdown voltage of the ignitor 116. In some embodiments, the sensors 125 are configured to directly measure the breakdown voltage. For example, the sensors 125 may include a voltage sensor positioned proximate the ignitor 116 and positioned to measure a voltage across the ignitor 116 (e.g., by measuring a voltage across two electrodes of a spark plug).

In some embodiments, the sensor data includes information that is measured directly, indirectly, inferred, and/or correlated from other data. For example, the sensors 125 are configured to determine the breakdown voltage based on measuring or determining another value referred to herein as a "breakdown voltage proxy" or simply "proxy". In some embodiments, the sensors 125 include a power or current sensor positioned proximate the ignitor 116 and positioned to measure a power or current provided to the ignitor 116. In these embodiments, the sensors 125 and/or the controller 140 may determine the breakdown voltage based on the measured power value or measured current value and a known resistance value of the ignitor 116. For example, the breakdown voltage may be equal to (i) the resistance value multiplied by the current value, (ii) the power value divided by the current value, and/or (iii) the square root of the power values times the square root of the resistance value.

In some embodiments, the sensors 125 include at least one of a voltage sensor, current sensor, or power sensor positioned proximate an ignition coil of the ignitor 116. The sensors 125 are configured to measure and/or determine (e.g. based on a power value and/or current value and a known resistance value of the ignition coil) a voltage of the ignition coil over a predetermined period of time. The sensors 125 and/or the controller 140 may determine a breakdown voltage based on integrating the ignition coil voltage over the predetermined time period (e.g., an area under ignition coil voltage graphed over time). For example, the sensors 125 and/or the controller 140 may use a model (e.g., a statistical model, a machine learning model) and/or a lookup table that correlates the area under ignition coil voltage graphed over time with a breakdown voltage value.

In some embodiments, the sensors 125 include at least one of a voltage sensor, current sensor, or power sensor positioned proximate a primary coil of the ignitor 116. The sensors 125 are configured to measure and/or determine (e.g. based on a power value and/or current value and a known resistance value of the primary coil) a voltage of a coil (e.g., a primary coil) over a predetermined period of time. The sensors 125 and/or the controller 140 may determine a breakdown voltage based on a derivative of the coil voltage over the predetermined time period (e.g., a slope of primary coil voltage graphed over time). For example, the sensors 125 and/or the controller 140 may use a model (e.g., a statistical model, a machine learning model) and/or a lookup table that correlates the slope of primary coil voltage graphed over time with a breakdown voltage value.

In some embodiments, the sensors 125 include at least one of a voltage sensor, current sensor, or power sensor positioned proximate a secondary transformer of the ignitor 116. The sensors 125 are configured to measure and/or determine (e.g. based on a power value and/or current value and a known resistance value of the secondary transformer) a voltage of the secondary transformer over a predetermined period of time. The sensors 125 and/or the controller 140 may determine a breakdown voltage based on a change in voltage of the secondary transformer over the predefined period of time. For example, the sensors 125 and/or the controller 140 may use a model (e.g., a statistical model, a machine learning model) and/or a lookup table that correlates the change in secondary transformer voltage with a breakdown voltage value.

In another embodiment, the sensors 125 are configured to determine the breakdown voltage based on a time duration between each ignition of the ignitor 116 (e.g., an "ignition event"). For example, one or more sensors 125 may be configured to determine a time between ignition events. In some embodiments, the sensors 125 include a voltage, current, and/or power sensor positioned proximate the ignitor 116 and configured to detect when ignition energy is provided to the ignitor 116 (e.g., by detecting an increase in voltage, current, and/or power from below a minimum threshold to above a maximum threshold). In some embodiments, the sensors 125 may include virtual sensors configured to determine when an ignition event for an ignitor has occurred based on a speed of the engine 110. As described herein, the speed of the engine 110 may be determined by real and/or virtual sensors 125. In other embodiments, the sensors 125 may include any other type of sensor configured to detect and/or determine when an ignition event occurs in an ignitor 116. Based on determining when ignition events occurred, the sensors 125 and/or the controller 140 may determine a time between subsequent ignition events. The sensors 125 and/or the controller 140 may determine a breakdown voltage based on the time between ignition events. For example, the sensors 125 and/or the controller 140 may use a model (e.g., a statistical model, a machine learning model) and/or a lookup table that correlates time between ignition events with a breakdown voltage value. For example, a relatively longer time between ignition events may indicate a relatively lower breakdown voltage and/or a relatively shorter time between ignition events may indicate a relatively higher breakdown voltage.

In some embodiments, determining the time between ignition events includes determining when an ignition event is commanded by the controller 140. In these embodiments, a current sensor is positioned proximate a control wire that communicatively couples the controller 140 to the ignitor 116. In these embodiments, the current sensor may measure a current value of current flowing through the control wire(s). The sensors 125 and/or the controller 140 may determine when an ignition event is commanded by the controller 140, based on detecting that the current flowing through the control wire is greater than a predetermined threshold. Based on determining when ignition is commanded by the controller 140, the sensors 125 and/or the controller 140 may determine when the ignition events occurred. As described above, based on determine when the ignition events occurred, the sensors 125 and/or the controller 140 may determine a time between subsequent ignition events.

In some embodiments, determining the time between ignition events includes determining an ignition start time. The ignition start time may be determined by detecting when at least one of a power or current supplied to the ignitor 116 and/or a voltage across the ignitor 116 changes from below a minimum threshold to above a maximum threshold.

In some embodiments, the breakdown voltage may be determined based on a time between when voltage is first applied to the ignitor 116 and the ignition event. In these embodiments, at least one of a voltage sensor, current sensor, or power sensor positioned proximate the ignitor 116. The sensors 125 are configured to measure and/or determine (e.g. based on a power value and/or current value and a known resistance value of the ignitor) a voltage across the ignitor 116. The sensors 125 and/or the controller 140 may determine when the voltage is first applied to the ignitor 116 based on determining when the voltage across the ignitor 116 is greater than a first threshold. The sensors 125 and/or the controller 140 may determine when the ignition event occurred based on determining when the voltage across the ignitor 116 is greater than a second threshold. The sensors 125 and/or the controller 140 may determine a breakdown voltage based on the time between when voltage is first applied to the ignitor 116 and the ignition event. For example, the sensors 125 and/or the controller 140 may use a model (e.g., a statistical model, a machine learning model) and/or a lookup table that correlates time between when voltage is first applied to the ignitor 116 and the ignition event with a breakdown voltage value.

In some embodiments, the breakdown voltage may be determined based on a time between a breakdown voltage and an ignition coil voltage by measuring (e.g., by a voltage sensor) and/or determining (e.g., by a current and/or power sensor) a first voltage of a primary winding of the ignitor 116 versus and a second winding of the ignitor 116 versus ground. More specifically, a time between the application of a voltage to the primary winding of the ignitor 116 and the time of the spark at a second winding of the ignitor is predictable for a given engine system. The ramp rate of the secondary voltage to the breakdown voltage (also referred to as demand voltage) may be a function of the capacitance of the system, which is fixed or mostly fixed based on the geometries and materials of the ignition system and the engine relative to each other.

In another embodiment, the sensors 125 are configured to determine the breakdown voltage based on a duration of the ignition event (e.g., a spark time duration). For example, one or more sensors 125 may be configured to determine a duration of the ignition event. In some embodiments, the sensors 125 include a voltage, current, and/or power sensor positioned proximate the ignitor 116. The sensors 125 are configured to measure and/or determine (e.g. based on a power value and/or current value and a known resistance value of the ignitor 116) a voltage of the ignitor 116. The sensors 125 and/or controller 140 may determine the duration of the ignition event based on a period of time that the voltage of the ignitor 116 is greater than a corresponding threshold. Based on determining duration of the ignition event, the sensors 125 and/or the controller 140 may determine a breakdown voltage. For example, the sensors 125 and/or the controller 140 may use a model (e.g., a statistical model, a machine learning model) and/or a lookup table that correlates a duration of the ignition event with a breakdown voltage value.

In some embodiments, the sensors 125 include at least one of a voltage sensor, current sensor, or power sensor positioned proximate a discharge circuit of the ignitor 116. The sensors 125 are configured to measure and/or determine (e.g. based on a power value and/or voltage value and a known resistance value of the discharge circuit) a current of the discharge circuit over a predetermined period of time. The sensors 125 and/or the controller 140 may determine a breakdown voltage based on integrating the discharge circuit current over the predetermined time period (e.g., an area under discharge circuit current graphed over time). For example, the sensors 125 and/or the controller 140 may use a model (e.g., a statistical model, a machine learning model) and/or a lookup table that correlates the area under discharge circuit current graphed over time with a breakdown voltage value.

In another embodiment, the sensors 125 are configured to determine the breakdown voltage based on an ignition current switching time. For example, one or more sensors 125 may be configured to determine an ignition current switching time. In some embodiments, the sensors 125 include a voltage, current, and/or power sensor positioned proximate the ignitor 116. The sensors 125 are configured to measure and/or determine (e.g. based on a power value and/or voltage value and a known resistance value of the ignitor 116) a current of the ignitor 116. The sensors 125 and/or controller 140 may determine the ignition current switching time based on a period of time between the current in the ignitor 116 switching from a first value (e.g., when the ignitor 116 is being energized to cause the ignition event) to a second value (e.g., after the ignition event). In some embodiments, the first value is greater than the second value. In some embodiments the second value is approximately zero. Based on determining the ignition current switching time, the sensors 125 and/or the controller 140 may determine a breakdown voltage. For example, the sensors 125 and/or the controller 140 may use a model (e.g., a statistical model, a machine learning model) and/or a lookup table that correlates an ignition current switching time with a breakdown voltage value.

In some embodiments, the sensors 125 may include a sensor configured to determine whether a cylinder 112 has misfired. In certain embodiments, the sensors may include at least one of a voltage sensor, a current sensor, a power sensor, positioned proximate the ignitor 116 and configured to detect and/or determine (as described above) a voltage across the ignitor and/or a voltage at an ignitor supply line (e.g., a main coil of the ignitor) versus ground. The sensors 125 may determine that a cylinder 112 misfired based on determining that the voltage value is below a maximum threshold for a predetermined time period (e.g., an expected ignition event). In other embodiments, the sensors 125 may include a temperature sensor proximate the outlet of the engine 110 and configured to detect the temperature of exhaust gas output by the engine. The sensors 125 may determine that a cylinder 112 misfired based on determining that a temperature of the exhaust gas is below a predetermined temperature for the predetermined time period. In still other embodiments, the sensors 125 may include any other types of sensors configured to determine whether a cylinder 112 has misfired. In any of the above-described embodiments, the sensors 125 and/or the controller 140 is configured to determine the breakdown voltage based on a number of times a cylinder 112 corresponding to an ignitor 116 has misfired. For example, the sensors 125 and/or the controller 140 may use a model (e.g., a statistical model, a machine learning model) and/or a lookup table that correlates cylinder misfire count with a breakdown voltage value.

In some embodiments, the sensors 125 may include temperature sensor disposed proximate to the ignitor 116 and positioned to acquire data indicative of a temperature operating condition (e.g., a temperature value) for the ignitor 116. The sensors 125 and/or the controller 140 may determine a breakdown voltage based on the temperature operating condition of an ignitor 116. For example, the sensors 125 and/or the controller 140 may use a model (e.g., a statistical model, a machine learning model) and/or a lookup table that correlates temperature operating condition with a breakdown voltage value. For example, a relatively lower temperature may indicate a relatively lower breakdown voltage and/or a relatively higher temperature may indicate a relatively higher breakdown voltage.

In some embodiments, the sensors 125 may include a temperature sensors disposed proximate to an outlet of the engine 110 and positioned to acquire data indicative of a temperature of exhaust output by the engine 110. The sensors 125 and/or the controller 140 may determine a breakdown voltage based on a change in temperature of the exhaust gas output by the engine 110 over a predefined period of time. For example, the sensors 125 and/or the controller 140 may use a model (e.g., a statistical model, a machine learning model) and/or a lookup table that correlates change in temperature over the predefined period of time with a breakdown voltage value. For example, a relatively larger changes temperature may indicate a relatively lower breakdown voltage and/or a relatively lower (e.g., negative) temperature may indicate a relatively higher breakdown voltage.

In some embodiments, the sensors 125 may include a gas sensor disposed proximate to the ignitor 116 and positioned to acquire data including one or more gas constituent values of combustion gases (e.g., air-fuel mixture, exhaust, etc.) proximate the ignitor 116. The sensors 125 and/or the controller 140 may determine a breakdown voltage based on the one or more gas constituent values of the combustion gases proximate the ignitor 116. For example, the sensors 125 and/or the controller 140 may use a model (e.g., a statistical model, a machine learning model) and/or a lookup table that correlates one or more gas constituent values with a breakdown voltage value. For example, a relatively high concentration of fuel in the combustion gases may indicate a relatively lower breakdown voltage and/or a relatively lower concentration of fuel in the combustion gases may indicate a relatively higher breakdown voltage.

In some embodiments, the sensors 125 may include a vehicle distance sensor configured to acquire data regarding a distance traveled by the vehicle. In some embodiments, the vehicle distance sensor may be a physical sensor disposed proximate the engine 110, part of a drivetrain of the vehicle (e.g., a drive shaft, an axle, etc.) and/or a wheel or tire. The physical vehicle distance sensor may be configured to determine a distance traveled by the system 100, for example, by measuring the rotation and/or speed of the engine, drivetrain, and/or wheel/tire and correlating this value to a distance (e.g., via a look-up table or other methodology). In other embodiments, the vehicle distance sensor is a virtual sensor configured to determine a distance traveled by the system 100 based on an estimated speed of the engine and/or vehicle over a period of time.

In some embodiments, the sensors 125 may include a fuel sensor disposed proximate a fuel system of the system 100 and/or proximate the engine 110. The fuel sensor may be configured to acquire data regarding a fuel value (e.g., in gallons, liters, etc.) or fuel rate (e.g., in miles per gallon, gallons per mile, etc.). The fuel value and/or fuel rate may include total amount of fuel used/consumed by the engine 110, an amount of fuel used/consumed by the engine 110 while idle, an amount of fuel used/consumed by the engine 110 during a trip, etc. In some embodiments, when the fuel consumed by the engine is gaseous (e.g., hydrogen, natural gas, etc.) the fuel sensor may be configured to determine the fuel value and/or fuel rate based on a pressure change in a fuel storage tank and/or based on a volume of gas released from the storage tank. In some embodiments, the fuel sensor is configured as a fuel temperature sensors that is configured to determine a temperature of the fuel provided to the engine 110.

In some embodiments, the sensors 125 may include an engine sensor disposed proximate the engine 110. The engine sensors may be configured to acquire data regarding the operation of the engine 110. In an example embodiment, the engine sensors may be configured to determine an engine speed, as described above. In another example embodiment, the engine sensors may be configured to determine a total operating time for the engine 110 based on an amount of time that the engine 110 is turned on (e.g., idle and/or under load) and/or determine an idle time based on an amount of time the engine 110 is idle. In another example embodiment, an engine run time and/or an engine idle time may be calculated, estimated, or otherwise determined by the controller 140 and/or a separate an engine control unit. In yet another example embodiment the engine sensors may be configured to determine an engine load value (e.g., percentage) at a current operating condition (e.g., engine speed). The engine load value, namely percentage, is based on a current engine load (detected by the engine sensor) divided by a maximum engine load multiplied by one-hundred. In still another example embodiment, the engine sensor may be configured to determine an engine percent torque based on a current engine torque (detected by the engine sensor) divided by a maximum engine torque multiplied by one-hundred. In other embodiments such as when the system is embodied in a power generation system (e.g., a generator), the engine load value may be a power output value (measured in kilowatts or another unit) of the engine 110. In these embodiments, the engine load value may be measured and/or determined by a power sensor, such as a voltage sensor and/or a current sensor (in this way, power output may be determined by a determined voltage value multiplied with a determined current value). In another example embodiment, the engine sensor may be configured as knock sensors. The knock sensors may be configured to determine an engine cylinder knock level based on vibrations detected within a cylinder 112.

In any of the above described embodiments, the data acquired by the sensors 125 may include metadata. The metadata may be acquired and/or determined by the sensors 125 and/or the controller 140. The metadata may include vehicle information (e.g., a vehicle identification number (VIN), a make, a model, etc.) an engine identification (e.g., a serial number, a calibration identification, a calibration verification number, etc.) a software identifier (e.g., a software identification number, a number of software identification fields, etc.), a unit number, etc. In some embodiments, the metadata includes a timestamp indicating when the data value occurred or was acquired by a sensor. In some embodiments, the metadata includes a timestamp indicating when the data was sent by the controller 140 to another device, such as the remote computing system 222 of FIG. 2.

In any of the above described embodiments, the sensors 125 may be configured to receive sensor data indicative of the breakdown voltage (e.g., the voltage value, the current value, the power value, the ignition timing information, the temperature operating condition information, the gas constituent value(s), etc.) based on an ignition event timing (e.g., once per ignition event, twice per ignition event, etc.) and/or based on a predetermined determined cycle (e.g., every second, every millisecond, etc.).

The controller 140 is communicably coupled to the sensors 125. Accordingly, the controller 140 is structured to receive data from one more of the sensors 125. The received data may be used by the controller 140 to control one more components in the system 100 and/or for estimation and forecasting purposes.

The operator I/O device 130 may be coupled to the controller 140, such that information may be exchanged between the controller 140 and the I/O device 130, wherein the information may relate to one or more components of FIG. 1 or determinations (described below) of the controller 140. The operator I/O device 130 enables an operator of the system 100 to communicate with the controller 140 and one or more components of the system 100 of FIG. 1. For example, the operator input/output device 130 may include, but is not limited to, an interactive display, a touchscreen device, one or more buttons and switches, voice command receivers, etc. In this way, the operator input/output device 130 may provide one or more indications or notifications to an operator, such as a malfunction indicator lamp (MIL), etc. Additionally, the vehicle may include a port that enables the controller 140 to connect or couple to a scan tool so that fault codes and other information regarding the vehicle may be obtained.

The vehicle subsystems 135 may include one or more components, systems, and/or devices included with the vehicle, such as mechanically driven or electrically driven vehicle components. The vehicle subsystems 135 may include, but are not limited to, an HVAC system, lights, pumps, fans, and so on.

In some embodiments, the vehicle subsystems 135 also include one or more components positioned downstream of the engine 110 and configured to receive exhaust output by the engine 110. In some embodiments, the system 100 includes a turbocharger configured to receive exhaust output by the engine 110 and compress intake fluid (e.g., air, etc.) provided to the engine 110. In some embodiments, the system 100 includes an aftertreatment system having components used to convert exhaust emissions, such as selective catalytic reduction (SCR) catalyst, a diesel oxidation catalyst (DOC), a diesel particulate filter (DPF), a diesel exhaust fluid (DEF) doser with a supply of diesel exhaust fluid, a plurality of sensors for monitoring the aftertreatment system (e.g., a nitrogen oxide (NOx) sensor, temperature sensors, etc.), and/or still other components.

The controller 140 is structured to control, at least partly, the operation of the system 100 and associated sub-systems, such as the engine 110 and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

As the components of FIG. 1 are shown to be embodied in the system 100, the controller 140 may be structured as one or more electronic control units (ECU), such as one or more microcontrollers. The controller 140 may be separate from or included with at least one of a transmission control unit, an exhaust aftertreatment control unit, a powertrain control module, an engine control module, etc.

In some embodiments, the ignition systems 114 may be controlled, at least partly, by the controller 140. For example, one or more parameters of the ignitor 116 may be controlled by the controller 140. The parameters of the ignitor 116 may include an amount of energy supplied to the ignitor 116, a time duration of a spark commanded from the ignitor 116, an amount of times a spark is commanded within a set of strokes of the engine (e.g., the Otto cycle), and other ignition control parameters. As described herein, the controller 140 may determine a voltage value (e.g., the breakdown voltage) of the energy provided to the ignitor 116. As described above, the breakdown voltage may be determined using one or more sensors 125.

Figure 2:
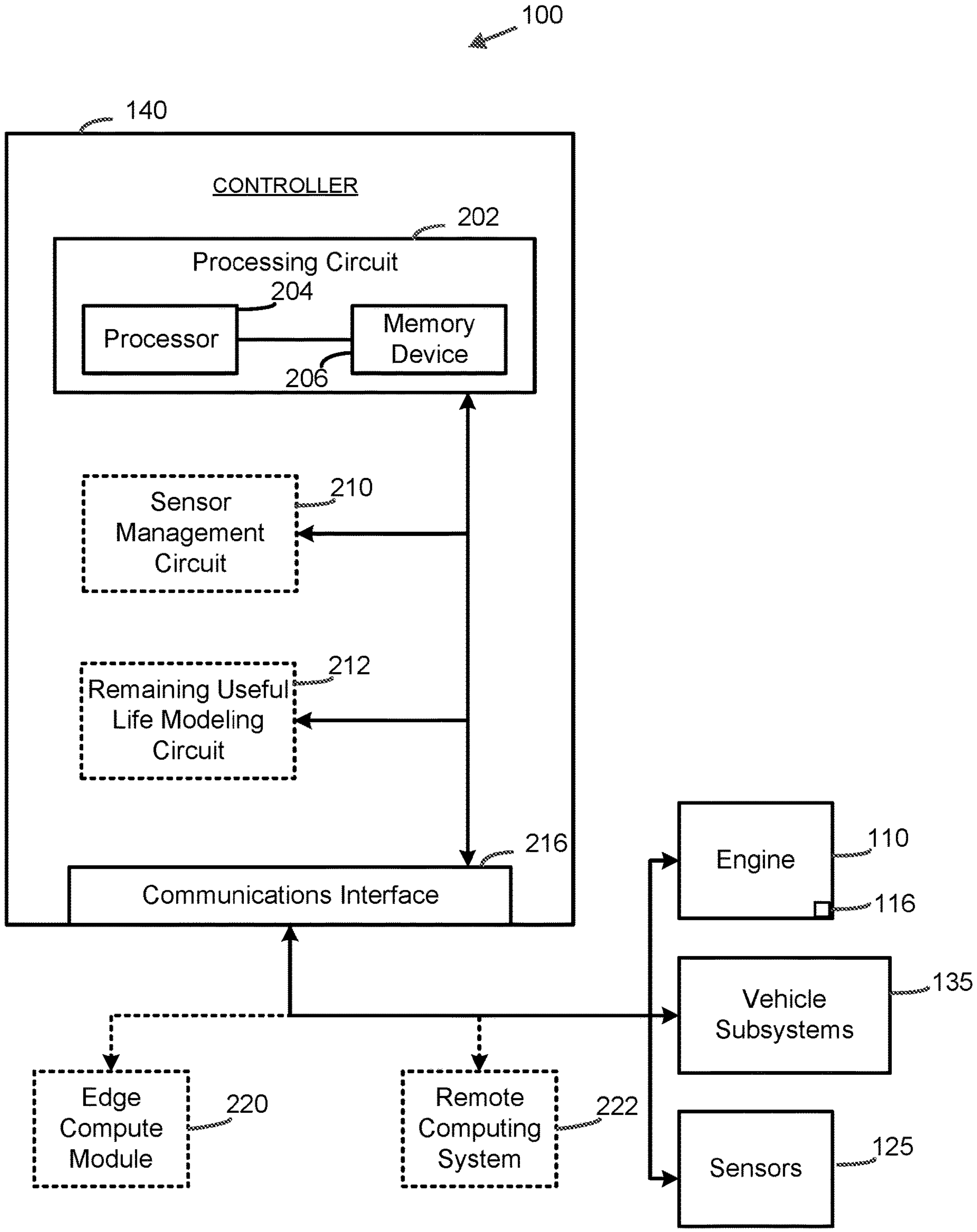
FIG. 2 is a block diagram of the controller of FIG. 1 coupled to various vehicle components, systems, and/or devices, according to an example embodiment.

Now referring to FIG. 2, a schematic diagram of the controller 140 of the system 100 of FIG. 1 is shown coupled to various systems and devices, according to various example embodiments. As shown in FIG. 2, the controller 140 includes a processing circuit 202 having a processor 204 and a memory device 206. In some embodiments, the controller 140 can include a sensor management circuit 210, and a communications interface 216. In some embodiments, the controller 140 optionally includes a remaining useful life modeling circuit 212. In embodiments where the controller 140 does not include the sensor management circuit 210, the RUL modeling circuit 212, and/or the communications interface 216, the processing circuit 202 may perform the functions of the sensor management circuit 210, the RUL modeling circuit, and/or the communications interface 216 described herein. As described herein, the controller 140 is structured to determine a RUL of an ignitor 116.

In one configuration, the sensor management circuit 210 and/or the RUL modeling circuit 212 are embodied as machine or computer-readable media storing instructions that are executable by a processor, such as processor 204. The machine-readable media may include programmable logic. The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the sensor management circuit 210 and/or the RUL modeling circuit 212 are embodied as hardware units, such as one or more electronic control units. As such, the sensor management circuit 210 and/or the RUL modeling circuit 212 may be embodied as one or more circuitry components including, but not limited to, processing circuitry, network interfaces, peripheral devices, input devices, output devices, sensors, etc. In some embodiments, the sensor management circuit 210 and/or the RUL modeling circuit 212 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the sensor management circuit 210 and/or the RUL modeling circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The sensor management circuit 210 and/or the RUL modeling circuit 212 may also include or be programmable hardware devices such as field programmable gate arrays, programmable array logic, programmable logic devices or the like. The sensor management circuit 210 and/or the RUL modeling circuit 212 may include one or more memory devices for storing instructions that are executable by the processor(s) of the sensor management circuit 210 and/or the RUL modeling circuit 212. The one or more memory devices and processor(s) may have the same definition as provided below with respect to the memory device 206 and processor 204. In some hardware unit configurations, the sensor management circuit 210 and/or the RUL modeling circuit 212 may be geographically dispersed throughout separate locations in the system 100. Alternatively, and as shown, the sensor management circuit 210 and/or the RUL modeling circuit 212 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the sensor management circuit 210 and/or the RUL modeling circuit 212. The depicted configuration represents the sensor management circuit 210 and/or the RUL modeling circuit 212 being embodied as machine or computer-readable media storing instructions. However, as mentioned above, this illustration is not meant to be limiting as the present disclosure contemplates other embodiments where at least one of the sensor management circuit 210 and/or the RUL modeling circuit 212 is configured as a hardware unit. All such combinations and variations are intended to fall within the scope of the present disclosure.

The at least one processor 204 may be implemented as one or more single- or multi-chip processors, digital signal processors (DSPs), application specific integrated circuits (ASICs), field programmable gate arrays (FPGAs), and/or suitable processors (e.g., other programmable logic devices, discrete hardware components, etc. to perform the functions described herein). A processor may be a microprocessor, a group of processors, etc. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the sensor management circuit 210 and/or the RUL modeling circuit 212 may comprise or otherwise share the same processor which, in some example embodiments, may execute instructions stored, or otherwise accessed, via different areas of memory). Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The at least one memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. For example, the memory device 206 may include dynamic random-access memory (DRAM). The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 216 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with an edge computing device, with a remote server). For example, and regarding out-of-vehicle/system communications, the communications interface 216 may include an Ethernet card and port for sending and receiving data via an Ethernet-based communications network and/or a Wi-Fi transceiver for communicating via a wireless communications network. The communications interface 216 may be structured to communicate via local area networks or wide area networks (e.g., the Internet) and may use a variety of communications protocols (e.g., IP, LON, Bluetooth, ZigBee, radio, cellular, near field communication). In other embodiments, a telematics device may be included that enables out-of-vehicle communications (e.g., V2X communications).

In some embodiments, the controller 140 can be coupled to one or more other components of the system 100. In some embodiments, the controller 140 can be coupled to the engine 110 and/or one or more components thereof, such as one or more of the ignitors 116. In some embodiments, the controller 140 can be coupled to the vehicle subsystems 135. In some embodiments, the controller 140 can be coupled to the sensors 125.

The sensor management circuit 210 is structured or configured to control the operation of the sensors 125 and exchange information with the sensors 125. For example, the sensor management circuit 210 may be structured to generate one or more control signals and transmit the control signals to one or more sensors 125 (e.g., to acquire data, etc.). The control signals may cause the one or more sensors 125 to sense and/or detect the sensor data and/or provide the sensor data to the sensor management circuit 210. In some embodiments, the sensor management circuit 210 may be structured to estimate the sensor data (e.g., when the sensors 125 are virtual sensors). The "sensor data" may include temperature data (e.g., fluid temperature such as exhaust gas temperature or engine oil temperature, component temperature such as engine temperature, etc.), flow rate data (e.g., exhaust gas flow rate data, charge air flow rate, etc.), pressure data (e.g., engine cylinder pressure, coolant pressure, exhaust gas pressure, etc.), engine operational data (e.g., engine torque, engine speed, engine power, etc.), and/or other data related to the operation of the system 100, such as data indicative of a voltage breakdown of a ignitor 116. The data may be used to determine the RUL of the ignitors 116.

The RUL modeling circuit 212 is structured to determine a RUL of at least one of the ignitors 116 of the system 100. More specifically, the RUL modeling circuit 212 is structured to retrieve and use a RUL model(s) (e.g., a statistical model, a regression model, a machine learning model, etc.) to generate a predicted RUL for at least one of the ignitors 116 of the system 100. As described herein, the RUL modeling circuit 212 may generate or train the RUL model based on data received from the sensors 125 and/or other data.

In some embodiments, the RUL modeling circuit 212 may determine the RUL responsive to determining, detecting, and/or receiving at least one enable condition. The "enable conditions" are indicative of a "normal" operation of the system 100 or, more specifically, the ignition system 114. As described herein, "normal" or typical operation of the system 100 refers to time period(s) when the engine output is above the predefined low-load threshold, within a predefined range of a predefined engine outputs (e.g., within 10%, within 20%, etc. of an average or median value), and/or below a predefined high-load threshold. In some embodiments, the enable conditions may not be present or satisfied when an issue is present in the system 100 or, more specifically, in the ignition system 114.

In some embodiments, the RUL modeling circuit 212 is structured or configured to determine, detect, and/or receive an indication that the operation of the engine system is not normal (i.e., does not satisfy a predefined operating condition). For example, the RUL modeling circuit 212 may receive an indication of an issue or other not-normal or undesired operating condition with the ignition system 114. In one embodiment, the issue may include a component(s) failure and/or potential component(s) failure. For example, in certain embodiments, the RUL modeling circuit 212 is structured to receive and/or determine the presence of one or more fault codes (diagnostic trouble codes, error indicators, etc.) associated with the operation of the engine 110. The one or more fault codes may be related to electrical failures of the ignition system 114. In particular, the electrical failure may be related to a component of the ignition system 114 that provides a command to fire an ignitor 116, measures a breakdown voltage, and/or measures a breakdown voltage proxy. Responsive to receiving and/or determining the presence of one or more fault codes corresponding to the ignition system 114, the RUL modeling circuit 212 may determine that the issue indicated by the fault code(s) may result in spurious values of breakdown voltage. In some embodiments, issue indicated by the fault code(s) may include a temporary or intermittent failures, high frequency noise, etc. Examples of electrical noise associated with the ignition system 114 may include an ignition voltage output being above or below a corresponding threshold, an ignition coil (primary or secondary) voltage being above or below a corresponding threshold, an ignition system current being above or below a corresponding threshold, an indication of an electrical short within the ignition system 114, and/or another issue in the ignition system 114. Any of the above-described examples of issues are indicative of abnormal behavior of the ignition system 114 and/or a component thereof, such as an ignitor 116. In the presence of one or more of these issues, one or more cylinders 112 of the engine 110 may not combust fuel as desired, resulting in, e.g., low exhaust gas temperatures of the respective cylinders 112. Consequently, the engine 110 may not be able to support load, and, in some cases may enable an emergency shutdown mode to prevent further issues.

In particular, the one or more fault codes that may prevent the at least one enable condition may be specific to one or more operating conditions for the ignition system. In another embodiment, the at least one fault code is indicative of an issue with the exhaust gas generated by the engine 110. For example, the at least one fault code may include an indication that a temperature of exhaust gas at an outlet of the engine 110 is below a predetermined threshold. In this regard, the fault codes may be based on information about a health or status of the ignition system 114.

In some embodiments, the at least one enable condition is present or is satisfied based on determining that one or more operational parameter values satisfy a corresponding threshold (e.g., below a maximum threshold, above a minimum threshold, within a threshold range of values, etc.). For example, the at least one enable condition may include determining that an engine speed (determined by one or more sensors 125, as described above) is above a minimum speed threshold or below a maximum speed threshold for a predefined time period. In another example, the at least one enable condition is satisfied based on determining that a fuel consumption rate (determined by one or more sensors 125, as described above) of the engine 110 is at or above a predetermined fuel consumption threshold for a predefined time period. In still other embodiments, the at least one enable condition is satisfied when a status of an ignition coil indicates that the ignition coil is healthy (e.g., a new ignitor, a recently repaired ignitor, or a previously determined RUL of the ignitor is greater than a predetermined threshold).

Advantageously, the RUL modeling circuit 212 may not determine, detect, and/or receive the at least one enable condition when a fault code is present. The RUL modeling circuit 212 advantageously prevents data that corresponds to a fault code (e.g., when a fault code is issued) or other issue in the system 100 from being used to in the RUL model. More specifically, data (e.g., sensor data, operational data, etc.) that corresponds to a component failure (or when a component or predefined component(s) failed even without corresponding to a particular component focus of the model, such as an ignitor) may result in inaccurate RUL predictions when used to train and/or generate the RUL model. The RUL model uses data (e.g., sensor data, other data, etc.) that corresponds to a normal operation of the engine (or other component and/or system). When one or more issues, fault codes, or other abnormal conditions are detected, determined, and/or received by the RUL modeling circuit 212, the RUL modeling circuit 212 may prevent the corresponding data from being used in the RUL model. In any of the above-described embodiments, the RUL modeling circuit 212 is structured to determine a RUL of at least one of the ignitors 116 of the system 100 responsive to receiving at least one enable condition. Thus, the robustness of model to "noise" caused by intermittent, partial, and/or complete failure of neighboring sub-systems may be improved by consolidating information from other diagnostics, such as fault codes or other diagnostic trouble codes.

Advantageously, when the enable conditions are not satisfied, the RUL modeling circuit 212 prevents data that does not correspond to normal operations of the system 100 or, more specifically, the ignitor 116, from being analyzed. For example, intermittent or partial failures of sub-systems or components of the ignition system 114 that neighbor the ignitor 116, such as ignition coils, wiring pins, electrical harness, etc., may be excluded from a data set that is analyzed by the RUL modeling circuit 212. For example, data with active faults in the neighboring sub-systems would be excluded by a data pre-processing logic performed by the RUL modeling circuit 212. In another example, data corresponding to a low-load condition (e.g., engine load values at or below a predetermined low-load threshold) and/or a high-load condition (e.g., engine load values at or above a predetermined high-load threshold) may be excluded by a data pre-processing logic performed by the RUL modeling circuit 212.

Responsive to determining, detecting, and/or receiving an indication of the at least one enable condition, the RUL modeling circuit 212 may receive data corresponding to the health of the ignitors 116, referred to herein as "ignitor data". It should be understood that the ignitor data may include data corresponding to other components of the system 100, such as the engine 110, the vehicle subsystems 135, etc. For example, the ignitor data may include any of the sensor data described herein. More specifically, the ignitor data may include sensor data corresponding to each of the ignitors 116, the engine 110, and/or other components of the system 100. In some embodiments, the ignitor data includes breakdown voltage values for each of the ignitors 116. In some embodiments, the ignitor data may be timestamped such that each data value corresponds to a time value.

In some embodiments, the ignitor data includes a proxy value, such as a current value, a power value, a time between ignition events, a temperature condition (e.g., a temperature value), a combustion gas constituent value and/or other proxy values described herein. As described above, the proxy value may be used to determine the breakdown voltage value.

As described herein, the ignitor data may include data corresponding to each of the ignitors 116 of the system 100 and/or data corresponding to other components of the system 100, such as the engine 110. In other embodiments, the ignitor data may be specific to a single ignitor 116. In these embodiments, the ignitor data may or may not include data corresponding to other components of the system 100, such as the engine 110.

In some embodiments, the RUL modeling circuit 212 may receive information regarding the operation of the engine 110 (referred to herein as "engine data"). The engine data may include one or more operational parameters, operational data, duty cycle data, and/or other information regarding the operation of the engine 110. In some embodiments, the engine data includes engine load data (e.g., a load on the engine). In some embodiments, the engine load data includes one or more engine load values. Each engine load data may have a corresponding time stamp (e.g., a date, a time of day, an engine hours value, etc.). In some embodiments, the controller 140 receives, from one or more sensors 125, ignitor data regarding one or more of the ignitors 116. The controller 140 may also receive, from one or more sensors 125, engine data regarding the engine 110.

The RUL modeling circuit 212 may "pre-process" the ignitor data according to one or more predefined operations. In some embodiments, the predefined operations for pre-processing the ignitor data, by the RUL modeling circuit 212, may include converting data in a non-standard format into a standard format. In some embodiments, a "standard" format refers to a predetermined arrangement of information, such as sensor data, operational parameters, etc. A "non-standard" format refers to an arrangement of information that is different from the predetermined arrangement. The arrangement of the information may include one or more of data types (e.g., engine speed data, breakdown voltage data, or other suitable data types), corresponding metadata (e.g., timestamps, software-based identifiers, etc.), data structures (e.g., arrays, linked lists, stacks, queues, etc.), data file types (e.g., comma-separated values, JSON, etc.), and/or other suitable arrangements of information. For example, a first portion of the ignitor data may include data from a first sensor type in a first format and a second portion of the ignitor data may include data from a second sensor type in a second format. RUL modeling circuit 212 may be structured to receive the ignitor data including data of different formats and convert the data to a standardized format. For example, the ignitor data may include a list of sensor data and/or operational parameters. At least a first portion of the sensor data and/or operational parameters may include standard sensor data and/or operational parameters. In some embodiments, the first portion of the list of sensor data and/or operational parameters is defined by a user, such as a service provider or a manufacturer of the system 100 or one or more components thereof. In some embodiments, at least a second portion of the list of sensor data and/or operational parameters may include non-standard sensor data and/or operational parameters. In some embodiments, the second portion of the list may be defined by a user, such as an owner or operator of the system 100. RUL modeling circuit 212 may receive the ignitor data that may be collected via different mechanisms (e.g., Ethernet, telematics devices, etc.). In this regard, the way that the ignitor data is packaged and sent to the RUL modeling circuit 212 may vary. For example, the ignitor data sent to the RUL modeling circuit 212 may include the non-standard list of sensor data and/or operational parameters and/or other signatures that are non-standard.

Advantageously, to use the non-standard ignitor data in the model, the RUL modeling circuit 212 is configured to standardize or "clean" the ignitor data. In some embodiments, the RUL modeling circuit 212 may be configured to delete information that is not needed to train the model. For example, the RUL modeling circuit 212 may delete information about the data collection mechanism (e.g., type of sensor, etc.).

In some embodiments, the predefined operations for pre-processing the ignitor data, by the RUL modeling circuit 212, may include cleaning and filtering operations, such as dropping empty rows, discarding zero load points and/or engine idle conditions. In some embodiments, at least a portion of the ignitor data may be removed or filtered based on a duty cycle of the system 100. For example, data corresponding to time values that are during a "low-load" operation may be removed or filtered out of the ignitor data. The "low-load" operation refers to a time period when an engine output (e.g., engine speed, engine torque, and/or engine power) is at or below a predefined low-load threshold. Advantageously, the RUL modeling circuit 212 improves the accuracy of the RUL model by excluding data corresponding to time values or other operating conditions that are during a low-load operation because low-load operation may not significantly contribute to degradation of the ignitor 116. In some embodiments, data points that correspond to a stable and steady operation of the engine are used in further calculations because relatively larger changes in engine load may result in temporary deviations of the inputs used by the RUL model, such as breakdown voltage and/or a breakdown voltage proxy. That is, the remaining, non-filtered data points correspond to a "normal" or typical operation of the system 100. The "normal" or typical operation refers to time period(s) when the engine output is above the predefined low-load threshold and/or within a predefined range of an average engine output (e.g., within 10%, within 20%, etc.).

In some embodiments, the RUL modeling circuit 212 may receive the ignitor data at a repeating, predefined interval (e.g., every few seconds, hourly, daily, etc.). In some embodiments, the predefined interval may vary depending on a duty cycle of the system 100, a sampling rate of the sensors 125, etc. In some embodiments, the predefined interval may vary depending on a polling rate of the RUL modeling circuit 212, the edge computing device 220, and/or other device that polls the sensors 125. In some embodiments, the predefined interval may be defined by an input received from a user. In other embodiments, the predefined interval may be defined by a derived interval based on equipment uptime.

In some embodiments, the RUL modeling circuit 212 may aggregate the ignitor data based on a predefined period (e.g., a trip, a day, a duty cycle, a predefined number of predefined intervals, etc.). Aggregating the ignitor data may include grouping ignitor data values having corresponding time stamps that are within the predefined period. For example, the RUL modeling circuit 212 may group breakdown voltage values that have corresponding time stamps that are within the same day. It should be understood that the RUL modeling circuit 212 may group other parameters of the ignitor data, such as engine power, engine torque, engine speed, exhaust temperature, etc.

Additionally and/or alternately, the ignitor data may be aggregated to a single point (e.g., an average, a median, a high value, a low value, etc.) for the predefined period. For example, the RUL modeling circuit 212 may aggregate the breakdown voltage values of the ignitor data during the predefined period to determine a value (e.g., mean, median, etc.) of the breakdown voltage values. It should be understood that the RUL modeling circuit 212 may aggregate data values for other parameters of the ignitor data, such as engine power, engine torque, engine speed, exhaust temperature, etc. Thus, the aggregated ignitor data may include data points with corresponding time values during the predefined period and/or an average value of the data points during the predefined period.

In some embodiments, the RUL modeling circuit 212 may determine a threshold and, particularly, a dynamic threshold, to aggregate the ignitor data. Advantageously, because ignitor degradation occurs at different rates depending on the duty cycle of the system 100 (e.g., degradation occurs more rapidly during high-load conditions and slower during low-load conditions), the dynamic threshold may be determined iteratively such that the dynamic threshold changes as the duty cycle of the system 100 changes. In particular embodiments, the dynamic threshold may be determined based on the relatively higher load indicator values (e.g., speed, torque, etc.) of the ignitor data. In one example, the RUL modeling circuit 212 may determine a dynamic threshold for aggregating the ignitor data based on the aggregated engine power values. For example, the dynamic threshold for aggregating the ignitor data may be a $50^{th}$ percentile of engine power values, an average of the top 50% of engine power values, etc. during the predefined period. In this way, the dynamic thresholds account for ignitor degradation rates that are duty cycle/load dependent (which also impact the breakdown voltage values). It should be understood that the RUL modeling circuit 212 may determine a dynamic threshold for other values of the ignitor data, such as engine torque values, engine speed values, exhaust temperature values, etc. For example, the RUL modeling circuit 212 may determine a dynamic threshold for one or more values that accurately or substantially accurately represents equipment operation and impact on ignitor degradation rate.

Advantageously, the dynamic threshold enables tracking of duty cycle changes of the system 100 thereby improving the accuracy of long-term RUL predictions. For example, the RUL calculation or determination may be based on data points that are above the dynamic threshold. More specifically, the RUL calculation may be based on ignitor data that corresponds to engine data values that are above the dynamic threshold (e.g., an engine load dynamic threshold), such that decreases in power output during a duty cycle do not cause the RUL prediction to underestimate the RUL of the ignitors 116. For example, the duty cycle may indicate that the system 100 is active for most (e.g., more than 50%) of a working day, such that the engine data values that correspond to the active portion of the day may be used in the RUL calculation. More specifically, the RUL modeling circuit 212 may determine a representative value of a breakdown voltage (e.g., an average breakdown voltage) based on data points that correspond to ignitor data that is above the dynamic threshold. For example, ignitor data may include engine power data that was detected and/or determined by one or more sensors 125 associated with the engine 110. The RUL modeling circuit 212 may determine a first set of engine power data values that are above the engine power dynamic threshold. In some embodiments, a "set" of data values, such as a set of engine power data values, includes multiple data values (e.g., two or more data values). In other embodiments, a "set" of data values includes at least one data value. Thus, as described herein, various "sets" of data values include at least one data value.

The RUL modeling circuit 212 may determine a first set of breakdown voltage values that correspond to the first set of engine power data values (e.g., breakdown voltage values that have the same time stamps as the engine power data values in the first set of engine power data values). The RUL modeling circuit 212 may determine an average breakdown voltage of the first set of breakdown voltage values. The first set of breakdown voltage values may correspond to the first set of engine power data values when the breakdown voltage values have the same time stamp as the engine power data values.

The RUL modeling circuit 212 may use the breakdown voltage values to predict the RUL of an ignitor 116. The breakdown voltage values may indicate conditions within a cylinder 112 experienced by an ignitor 116 which results in the wear of an electrode of the ignitor 116 over time. The conditions within the cylinder 112 may include a temperature value that exceeds a maximum temperature threshold, a pressure value that exceeds a maximum pressure threshold, etc. The temperature value may be a temperature within the cylinder 112 measured by a temperature sensor 125 located proximate the cylinder 112. The pressure value may be a pressure within the cylinder 112 measured by a pressure sensor 125 located proximate the cylinder 112. The RUL modeling circuit 212 may iteratively determine a predicted breakdown voltage trend based on the breakdown voltage values.

The RUL modeling circuit 212 may determine, based on the breakdown voltage trend of each ignitor 116 a RUL value for the corresponding ignitor 116. Each ignitor 116 of the engine 110 may experience different conditions within a corresponding cylinder 112 depending on engine geometry and combustion recipe, leading to a different degradation rate for each ignitor 116. The RUL modeling circuit 212 advantageously accounts for part-to-part variation of ignitors 116 and variable conditions within a cylinder 112 by determine the RUL value for each ignitor 116 individually.

The RUL modeling circuit 212 may generate a model (e.g., a statistical model, a regression model, a machine learning model, etc.) for each ignitor 116 of the engine 110. The model is trained using the aggregated breakdown voltage data and engine uptime (e.g., a time that the engine is not off and/or not idle during a duty cycle) for a given engine output condition (e.g., engine speed, engine torque, engine power, etc.). After number data points greater than a predetermined threshold have accumulated, the trained model is used to predict a breakdown voltage for the corresponding ignitor 116 for a predetermined future time horizon (e.g., 100-1000 hours of engine uptime). In some embodiments, the threshold number of data points is based on convergence of the model and/or a confidence metric of the model exceeding a confidence threshold. The predetermined future time horizon may be based on an input from a user (e.g., an operator of the system 100, a service technician, etc.) and/or based on an engine run time per day, a location of the system 100 relative to a service facility, etc.

In an example embodiment, the model includes a linear regression model determined based on a set of breakdown voltage values and corresponding time values. In some embodiments, the set of breakdown voltage values may be non-filtered breakdown voltage values. In some embodiments, the set of breakdown voltage values may correspond to engine power values that are above a dynamic threshold.

In other embodiments, the model may be based on an empirically derived relationship between engine operating duty cycle and ignition related operational data and/or operational parameters. For example, a first model for a first duty cycle may be determined based on ignition data of the first duty cycle. More specifically, the first model may correlate the ignition data to a future or anticipated future breakdown voltage value based on the first duty cycle. The first model may be used to predict a future breakdown voltage value for an engine that has a second duty cycle that is similar to the first duty cycle. As described herein, similar duty cycles may be determined based on one or more duty cycle values being within a threshold amount of each other. For example, the RUL modeling circuit 212 may determine that a first duty cycle is similar to a second duty cycle based on a first characteristic of the first duty cycle being within a threshold amount or value of a second characteristic of the second duty cycle. More specifically, when a first duty cycle first value (e.g., an engine torque of a first duty cycle) is within a threshold amount (e.g., less than 10% difference, less than 5% difference, etc.) of a second duty cycle first value (e.g., an engine torque of a second duty cycle) the first duty cycle is similar to the second duty cycle. In some embodiments, the first duty cycle is an empirical test duty cycle is based on empirical test data. In other embodiments the first duty cycle is a duty cycle of a system (e.g., vehicle) that is different than the system 100. Responsive to determining that a duty cycle of the system 100 is similar to a duty cycle of the first model, the RUL modeling circuit 212 may determine a future breakdown voltage value using the first model and ignition data that corresponds to the system 100.

In still other embodiments, the model includes a machine learning model, an artificial intelligence model, a neural network model, and/or any other suitable model. Further, it should be understood that the model may be suited for the ignitor type. In any of the above-described embodiments, the RUL modeling circuit 212 may automatically update the model based on receiving new ignitor data.

In some embodiments, the RUL modeling circuit 212 may compare the predicted breakdown voltage values to a breakdown voltage threshold value. The breakdown voltage threshold value (also referred to herein as a "breakdown voltage threshold") is a predetermined value that is based on one or more characteristics of the engine 110. In an example embodiment, the breakdown voltage threshold value can be based on a fuel type of the engine 110. That is, the breakdown voltage threshold value for a gasoline, propane, natural gas, and hydrogen, fueled engine can be different. For example, the breakdown voltage threshold value for a hydrogen fueled engine may be less than the breakdown voltage threshold value for a gasoline fueled engine (e.g., because hydrogen fuel can ignite at a lower voltage compared to gasoline fuel). A time value that corresponds to when the predicted breakdown voltage is equal to or greater than the breakdown voltage threshold may be used to determine the RUL value. In some embodiments, the time value may be measured in engine operating hours. For example, if a time value that corresponds to when the predicted breakdown voltage of a first ignitor 116 is equal to or greater than the breakdown voltage threshold is 500 engine hours, the RUL modeling circuit 212 may determine that the RUL of the first ignitor 116 is 500 engine hours. The first breakdown voltage threshold may be determined based on an ignitor type (e.g., spark plug, etc.), an ignitor manufacturer specification, and/or a predetermine margin of operation that is based on a type of ignition device of the ignitors 116. Responsive to determining that at least one of the predicted breakdown voltage values exceeds the first breakdown voltage threshold, the RUL modeling circuit 212 may generate a notification indicating that at least one of the ignitors 116 may need to be serviced soon (e.g., replaced or electrode re-gap). The notification may also indicate which ignitor 116 may need to be serviced. The RUL modeling circuit 212 may provide the notification to a user device of a user (e.g., an operator of the system 100, a service technician, etc.). In some embodiments, the RUL modeling circuit 212 may determine a predicted calendar date or calendar time that corresponds to the RUL. For example, the RUL modeling circuit 212 may predict that the system 100 will operate 500 engine hours in 90 days, based on the duty cycle of the system 100 indicating an average of 5.5 engine hours per day.

In some embodiments, the RUL modeling circuit 212 may use the model to determine the RUL value based on a predefined periodic schedule. The predefined periodic schedule refers to a regular, repeating schedule for determining the RUL value. For example, the RUL modeling circuit 212 may use the model to determine the RUL in real time (e.g., ever second, every millisecond, every minute, etc.) and/or at another time period (e.g., every hour, every day, once a week, etc.). The periodic schedule may be determined based on a duty cycle and/or an input from a user (e.g., an operator of the system 100 and/or a service technician). In some embodiments, when a new RUL value is calculated, a notification including the new RUL value in terms of engine operation hours is provided to a user via a user device (e.g., via email, text message, a hyperlink to a website, etc.). At the time of calculation, if the predicted voltage crosses the threshold within a predetermined period of time from the present (e.g., in the near future), then the notification may include a recommendation to service the system 100 and/or a component thereof.

Over time, the RUL modeling circuit 212 may receive additional ignitor data. The RUL modeling circuit 212 may retrain the model based on the additional ignitor data. In some embodiments, when training the model, the RUL modeling circuit 212 may use historical points of an ignitor 116 until a point of change in duty cycle and/or a point of a service event of the ignitor 116. As used herein a "service event" refers to a repair and/or replacement of a component. In particular, a service event for an ignitor 116 may refer to repair (e.g., a re-gap or re-gapping procedure) and/or a replacement of the ignitor 116. In some embodiments, the additional ignitor data may refer to ignitor data that is received after the change in duty cycle and/or the service event. The RUL modeling circuit 212 may retrain the RUL model and/or generate a new RUL model based on the additional data. This strategy of periodic iteration improves future RUL calculations.

In some embodiments, the RUL modeling circuit 212 may adjust (e.g., retrain) the model. For example, adjusting or retraining the model may be based on a change in duty cycle of the engine 110. Changes in the duty cycle of the engine 110 may impact the RUL of an ignitor 116. In some embodiments, the RUL modeling circuit 212 may identify changes (e.g., increases or decreases) in duty cycle above a predetermined threshold based on the engine output data. For example, the RUL modeling circuit 212 may detect and/or determine a change (e.g., an increase or a decrease)

in the duty cycle of the engine 110 during the predefined period that the ignitor data was aggregated. In some embodiments, the RUL modeling circuit 212 may generate a model based on a first set of voltage breakdown values that correspond to a period of time before the change in duty cycle and retrain the model based on a second set of voltage breakdown values that correspond to a period of time after the change in duty cycle. In other embodiments, the RUL modeling circuit 212 may generate a first model based on a first set of voltage breakdown values that correspond to a period of time before the change in duty cycle and a second model based on a second set of voltage breakdown values that correspond to a period of time after the change in duty cycle.

In some embodiments, the RUL modeling circuit 212 may generate the first model and/or the second model responsive to determining that the number of data points in the first data set and/or the second data set, respectively, is greater than a predetermined threshold.

In some embodiments, the RUL modeling circuit 212 may adjust the model responsive to detecting and/or determining a service event. The RUL modeling circuit 212 may automatically detect and/or determine the service event (e.g., without input from a user). For example, the RUL modeling circuit 212 may detect and/or determine a service event responsive to detecting and/or determining a decrease in breakdown voltage of an ignitor 116 that is not accompanied by a decrease in engine output. Responsive to detecting and/or determining the service event, the RUL modeling circuit 212 may flag the ignitor 116 as serviced and reset the model corresponding to the flagged ignitor 116. Resetting the model includes retraining the model based on ignitor data corresponding to a time period after the service event.

In some embodiments, RUL modeling circuit 212 may use historical data to train or re-train the model based on detecting and/or determining a service event. In particular, the RUL modeling circuit 212 may detect and/or determine when service event occurred and use data received after the service event to train or re-train the model. That is, the service event is used as a cutoff or trigger for training a new model or re-training an existing model. As more time passes after the service event occurred, the RUL modeling circuit 212 may gather additional data regarding the operation of the component to improve the accuracy of the predicted RUL value to train a new model or re-train the existing model. As the RUL modeling circuit 212 receives additional data, the size (e.g., bandwidth, file size in megabytes, gigabytes, etc.) and/or the frequency (e.g., a number of transmissions within a time period) of transmissions between the RUL modeling circuit 212 and other components of the controller 140 increases.

In some embodiments, the RUL modeling circuit 212 may be configured to adjust the model based on noise, component failures, and/or other behavior in the system 100. In particular, the RUL modeling circuit 212 may adjust a model for a component, such as an ignitor 116, such that inaccuracies caused by noise are mitigated or eliminated. As described herein "noise" refers to inaccuracies in data or other signals, which may be caused by load instability, intermittent, partial, or complete failure of neighboring sub-systems or components of the system 100, such as other ignitors, cylinders 112, fuel injectors, air handling systems, aftertreatment system components, etc., and/or other factors. The "noise" may temporarily impact spark breakdown voltage values. In some embodiments, the RUL modeling circuit 212 may use information from other diagnostics, such as fault codes, to adjust the model. For example, a fault code may be indicative of an intermittent, partial, or complete failure of neighboring sub-system or component. Responsive to detecting and/or receiving a fault code the RUL modeling circuit 212 may adjust the model to exclude data that is received while the fault code is active.

In some embodiments, the RUL modeling circuit 212 may be configured to adjust the RUL calculation based on "abnormal" values of breakdown voltage. As used herein, "abnormal" values of breakdown voltage refer to breakdown voltage values that are outside a predetermined range (e.g., greater than a maximum range value or less than a minimum range value). Abnormal breakdown voltage values may be caused by noise in other sub-systems of the system 100. The abnormal breakdown voltage values may, temporarily, impact predicted breakdown voltage values. Thus, the RUL modeling circuit 212 may adjust the model based on hardware limits of the ignitor 116, hardware testing (e.g., empirical testing values), and/or historical data corresponding to the same or similar ignitor 116. In some embodiments, the RUL modeling circuit 212 may adjust the model to exclude abnormal breakdown voltage values.

In some embodiments, the RUL modeling circuit 212 may detect abnormal regression value, such as a slope of a regression curve. As used herein, "abnormal" regression values or slopes refer to a value or slope of a linear regression model that is different than a "normal" regression value or slope. A normal/nominal regression value or slope may be defined by historical data, empirical lab testing data and/or experiments that define the regression value or slope or degradation rate of a component at various conditions (e.g., loads, such as one-hundred percent load, fifty percent load, etc.). Accordingly, the RUL modeling circuit 212 may compare a regression value or slope of the model to a "normal" regression value or slope based on the duty cycle (e.g., a load value) of the system 100, to determine whether the regression value or slope of the model is normal or abnormal. Responsive to determining that the difference between the regression value or slope of the model and a normal regression value or slope is greater than a threshold value (e.g., 5%, 10%, 20%, etc.), the RUL modeling circuit 212 may determine that the regression value or slope of the model is abnormal. Responsive to determining that the regression value or slope of the model is abnormal, the RUL modeling circuit 212 may adjust the model based on hardware limits or historical data corresponding to the same or similar ignitor 116. In some embodiments, the RUL modeling circuit 212 may adjust the model to exclude abnormal breakdown voltage values.

As described above, the RUL modeling circuit 212 may provide the notification to a user device of a user (e.g., an operator of the system 100, a service technician, etc.). The RUL value may be used for preventative maintenance and may be provided with recommended next steps. In some embodiments, the notification is sent periodically or on a predefined schedule. In some embodiments, if a health of an ignitor 116 begins to degrade to an extent of the engine 110 and/or a component thereof becoming inoperable or cause permanent damage to ignitors 116, the RUL modeling circuit 212 may immediately provide the notification to the user device.

In some embodiments, the notification includes a component health summary, which may include one or more RUL values for one or more components of the system 100. The component health summary may be used by engineers, manufacturers, product designers, and so on to analyze the impact of combustion calibration and fuel quality on the components, such as the ignitors 116. In some embodiments, a RUL value of one or more ignitors 116 may be provided as feedback to the controller 140 for optimizing performance of the engine 110 at the present degradation rate of the ignitors 116.

In some embodiments, when the RUL modeling circuit 212 detects and/or determines a service event, the RUL modeling circuit 212 is configured to determine a successfulness of the service event. For example, the RUL modeling circuit 212 may determine a degradation rate (e.g., a slope of a regression model that correlates breakdown voltage to engine operating time) of a component before the service event and determine a degradation rate after the service event. The RUL modeling circuit 212 may determine that the service event was successful responsive to determining that the degradation rate after the service event is less than the degradation rate before the service event. The RUL modeling circuit 212 may determine that the service event was not successful responsive to determining that the degradation rate after the service event is greater than the degradation rate before the service event. In some embodiments, the notification includes an indication of the successfulness of the service event and provide the notification to a service technician. In some embodiments, the successfulness of the service event may be used by the RUL modeling circuit 212 and/or the service technician to identify repair and/or replacement techniques that correspond to successful or more successful service events such that the repair and/or replacement techniques that correspond to successful or more successful service events may be used in future service events.

In some embodiments, the controller 140 is structured to control the operation of the ignitors 116. For example, the controller 140 may control an amount of power (e.g., electrical power) provided to each of the ignitors 116 by way of one or more voltage sources and/or one or more current sources. As an ignitor 116 degrades in performance (e.g., as the RUL of an ignitor decreases), the controller 140 may automatically provide more power to the ignitor 116. In this way, the breakdown voltage of the ignitor 116 may increase as the RUL of an ignitor decreases. In some embodiments, the controller 140 may adjust the amount of power or voltage (e.g., breakdown voltage) provided to the ignitor 116 based on a determined RUL of the ignitor 116. For example, as the determined RUL of the ignitor 116 decreases, the controller 140 may automatically increase the amount of power provided to the ignitor 116, thereby increasing the breakdown voltage of the ignitor 116.

As shown in FIG. 2, in some embodiments, the controller 140 may be coupled to an edge computing device 220. The edge computing device 220 may be separate from the controller 140. For example, the controller 140 may be communicatively coupled (e.g., via the communications interface 216) to the edge computing device 220. In other embodiments, the edge computing device 220 may be integrated with the controller 140.

As shown, the edge computing device 220 is configured as a separate hardware computing device. The edge computing device 220 may include a processing circuit having one or more processors and a memory device. In some embodiments, the processing circuit of the edge computing device 220 similar to the processing circuit 202 of the controller 140. The edge computing device 220 is configured to coordinate with the controller 140 and/or the remote computing system 222 such that processes that may be performed by the controller 140 and/or the remote computing system 222 are performed by the edge computing device 220. In some embodiments, the edge computing device may be configured to perform the same operations as the RUL modeling circuit 212. In some embodiments, the edge computing device 220 includes any combination of software and/or hardware for performing the operations of the RUL modeling circuit 212. In other embodiments, the RUL modeling circuit 212 is embodied in the edge computing device 220. In any of the above-described embodiments, the edge computing device 220 is configured to perform all of the operations of the RUL modeling circuit 212 described herein.

In some embodiments, the controller is coupled to a remote computing system 222. As shown in FIG. 2, in some embodiments, the remote computing system 222 may be separate from the controller 140. For example, the controller 140 may be communicatively coupled (e.g., via the communications interface 216) to the remote computing system 222. The remote computing system 222 may be a cloud computing system, a privately owned server, a public or licensed server (e.g., AWS, Azure, GCP, etc.), and/or other type of remote computing system. In any of the above-described embodiments, the remote computing system 222 may include a processing circuit similar to the processing circuit 202 described herein. In some embodiments, the remote computing system 222 is configured to perform all of the operations of the RUL modeling circuit 212 described herein.

Thus, the RUL calculation may be performed by at least one of the controller 140 (and the RUL modeling circuit 212 thereof), the edge computing device 220, and/or the remote computing system 222. As described herein, the edge computing device 220 may cooperate with the controller 140 and/or the remote computing system 222 to perform the operations described herein. In some embodiments, the controller 140 may be configured to provide data (e.g., sensor data, operational data, operational parameters, etc.) to the edge computing device 220 and/or the remote computing system 222. For example, the controller 140 may provide sensor data including a vehicle distance, a total fuel used by the engine 110, a fuel used by the engine 110 while idle, a fuel used by the engine 110 during a trip, an engine operating time, an engine speed, an engine load percentage, an engine torque percentage, an ignition device supply voltage, a cylinder knock level, a timing of an ignition event for an ignitor 116 and/or a cylinder 112, an engine fuel temperature, an engine idle time, other sensor data, and/or ignitor data described herein to the edge computing device 220 and/or the remote computing system 222. In some embodiments, the sensor data may include metadata such as an engine serial number, a VIN, a calibration ID, a calibration verification number, a number of software ID fields, a software ID, a make of a vehicle, a model of a vehicle, a unit number of an engine or powertrain, a data occurrence timestamp and/or a data transmission timestamp.

In some embodiments, the system 100 may include some or all of the above-described components. In an example embodiment, the system 100 includes the controller 140. The controller 140 is coupled to the engine 110 having the one or more ignitors 116. The controller 140 includes the one or more processors 204 and one or more memory devices 206. The one or more memory devices 206 store instructions that, when executed by the one or more processors 204, cause the controller 140 to perform operations. The operations include receiving, from one or more sensors 125 coupled to the controller 140, ignitor data regarding the one or more ignitors 116 and engine data regarding the engine 110. The operations also include pre-processing the ignitor data by removing a first set of ignitor data values of the ignitor data, the first set of ignitor data values corresponding to a first set of engine data values of the engine data. The operations also include aggregating the pre-processed ignitor data by grouping a second set of ignitor data values of the ignitor data. The operations also include determining a remaining useful life (RUL) value for each of the one or more ignitors 116 based on the second set of ignitor data values and a model. The operations also include providing the RUL on a display.

In some embodiments, the operations further include adjusting the RUL based on detecting a service event. Detecting the service event includes determining that each ignitor data value of a third set of ignitor data values is below a predetermined ignitor data value threshold and that each engine data value of a third set of engine data values is at or above a predetermined engine data value threshold. The third set of ignitor data values correspond to the third set of engine data values. In some embodiments, the operations further include retraining the model based on receiving new ignitor data, the new ignitor data including at least one of a fourth set of ignitor data values, where a first quantity of data values in the fourth set of ignitor data values is at or above a first quantity threshold, or a fifth set of ignitor data values, where a second quantity of data values in the fifth set of ignitor data values is at or above a second quantity threshold and each data value in the fifth set of ignitor data values is greater than a value threshold.

In some embodiments, the operations further comprise retraining the model based on determining that a third set of ignitor data values are outside a predetermined range, the third set of ignitor data values corresponding to a third time period after a second time period corresponding to the second set of ignitor data values. In some embodiments, the operations further include retraining the model based on determining that a difference between a regression value of the model and a nominal regression value is greater than a predetermined threshold. In some embodiments, the engine data includes a fault code occurring during a third time period. Pre-processing the ignitor data further includes removing a third set of ignitor data values from the ignitor data, the third set of ignitor data values corresponding to the third time period.

Figure 3:
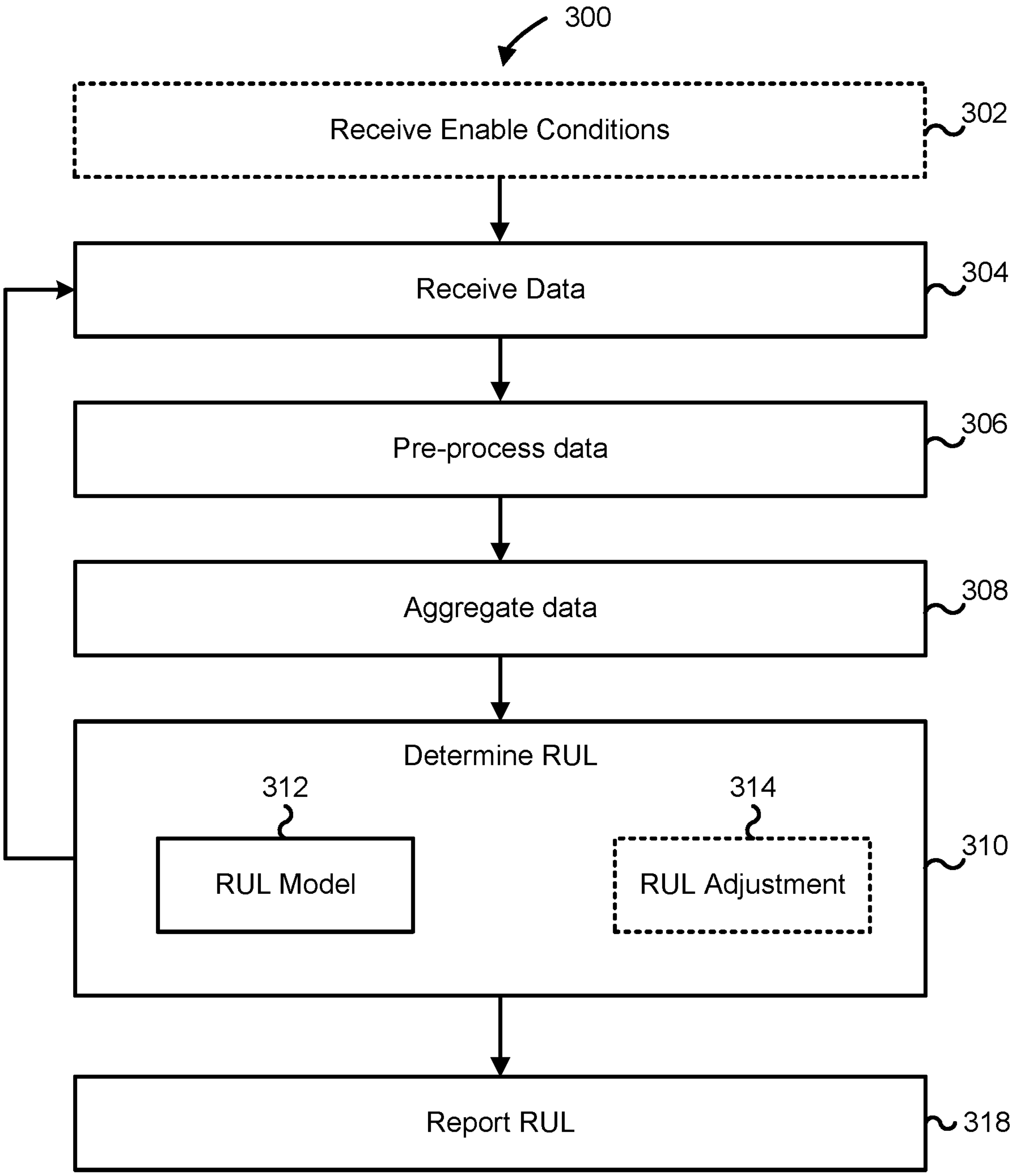
FIG. 3 is a flow diagram of a method of determining a remaining useful life of an ignition assist device, particularly a spark plug, of the vehicle system of FIG. 1, according to an example embodiment.

Now referring to FIG. 3, a flow diagram of a method 300 determining a RUL or RUL value for at least one ignitor 116 is shown, according to an example embodiment. In particular, the method 300 relates to calculating a RUL value based on the ignitor data, as described above. In some embodiments, the controller 140 and/or one or more components thereof, such as the sensor management circuit 210 and/or the RUL modeling circuit 212, is/are configured to perform method 300. For example, the controller 140 may be structured to perform the method 300, alone or in combination with other devices such as the sensors 125 and/or other components of the system 100. Accordingly, as described herein, the method 300 may be performed by the controller 140. However, it should be understood that the method 300 may be performed by other computing devices. For example, in some embodiments, the method 300 is performed by the edge computing device 220. In some embodiments, the method 300 is performed by the remote computing system 222. In some embodiments, the processes of the method 300 may be performed in a different order than as shown in FIG. 3. In some embodiments, the method 300 may include more or fewer processes than as shown in FIG. 3. In some embodiments, the processes of the method 300 may be performed concurrently, partially concurrently, or sequentially.

In some embodiments, the method 300 can be performed by the controller 140 and/or one or more components thereof. In some embodiments, the method 300 can be performed by the edge computing device 220 and/or the remote computing system 222.

In an example embodiment a method for determining a RUL of a component of the system 100 includes receiving, by at least one processing circuit 202, component data including sensor data corresponding to the component and engine data corresponding to the engine 110 of the system 100. The method also includes pre-processing, by the at least one processing circuit 202, the component data by removing a first set of sensor data values of the sensor data that correspond to a first set of engine data values of the engine data. The method also includes aggregating, by the at least one processing circuit 202, the pre-processed component data by grouping a second set of sensor values of the sensor data. The method also includes determining, by the at least one processing circuit 202, the RUL for the component based on a RUL model that correlates at least a portion of the aggregated data to the RUL. The method also includes adjusting, by the at least one processing circuit 202, the RUL based on at least one of detecting a service event or determining that one or more sensor data values of the sensor data are outside a predetermined range of values. The method also includes providing the RUL on a display.

In some embodiments, pre-processing the component data further includes transforming the component data from a non-standardized format into a standardized format. In some embodiments, the first set of engine data values of the engine data are less than or equal to a low load threshold value. In some embodiments, aggregating the pre-processed data comprises determining, by the at least one processing circuit 202, a dynamic threshold based on a second set of engine values that are greater than a predetermined threshold value. In some embodiments, the method further includes determining the RUL based on a third set of sensor values that correspond to a third set of engine data values that are greater than or equal to the dynamic threshold. In some embodiments, grouping the second set of sensor values of the sensor data is based on time stamps corresponding to (i) each sensor value of the second set of sensor values and (ii) each engine data value of a second set of engine data values of the engine data. In some embodiments, the component is the ignitor 116. In some embodiments, the one or more sensor data values of the sensor data correspond to a duty cycle such that determining that the one or more sensor data values of the sensor data are outside the predetermined range of values is indicative of a duty cycle change.

Referring to the method 300 in more detail, at process 302, the controller 140 receives enable conditions. As described above, the enable conditions may include the conditions described above.

At process 304, the controller 140 receives data. The data may include the ignitor data described herein. For example, the controller 140 may receive sensor data corresponding to the ignitor 116, engine data corresponding to the engine 110, and/or other data indicative of a breakdown voltage of an ignitor 116.

At process 306, the controller 140 pre-processes the data. In some embodiments, pre-processing the data may include removing or filtering out data that corresponds to a low load operation of the engine 110. In some embodiments, pre-processing the data may include transforming one or more data received in a non-standardized format into a standardize format.

At process 308, the controller 140 aggregates the data. In some embodiments, the controller 140 aggregates the data that has been pre-processed. For example, the controller 140 may not aggregate data that has been removed or filtered out at process 306. In some embodiments, aggregating the data may include grouping data values based on corresponding time stamps. In some embodiments, aggregating the data may include determining an average value for a set of values.

In some embodiments, at process 308, the controller is also configured to determine a dynamic threshold to aggregate data. In these embodiments, the controller 140 may use a first set of engine output values that are above the dynamic threshold to identify a corresponding first set of breakdown spark values. The first set of breakdown spark values may be used to determine the RUL value at process 310.

At process 310, the controller determines a RUL value for an ignitor 116. As described above, the RUL value may be determined based on a RUL model 312 generated by the controller 140 and/or a RUL adjustment 314. The RUL model 312 may be generated and/or updated by the controller 140 as data is received, pre-processed, and/or aggregated at processes 304-308. The RUL adjustment 314 may be based on an updated RUL model 312 and/or responsive to detecting and/or determining a service event.

In some embodiments, the method 300 may repeat process 304-310 for each ignitor 116 of the engine 110. Accordingly, the controller 140 may determine a RUL value for each ignitor 116.

At process 318, the controller 140 reports the RUL value(s) determined at process 310. In some embodiments, the controller 140 provides the RUL on a display. The display can be one or more of a display of a computing system (e.g., a user device), a display included in the system 100 (e.g., the operator I/O device), or other suitable display. In some embodiments, the controller 140 may report the RUL value to a user device of a user (e.g., an operator or owner of the system 100, a service technician, a manufacturer of the system 100, etc.). In some embodiments, the controller 140 may report the RUL value by causing the operator I/O device 130 to display the RUL value. In some embodiments, the controller 140 may output a RUL report to a user device (e.g., a computer, a laptop, a smartphone, etc.) via a web portal (e.g., website accessed by a web browser, etc.), email, text messages (e.g., SMS, MMS, RCS, instant messaging, etc.), notifications (e.g., push notifications from a mobile application, etc.), etc.

In some embodiments, the method 300 may be performed by a non-transitory computer readable media. The non-transitory computer readable media may be or include the memory device 206. In an example embodiment a non-transitory computer readable media stores instructions that, when executed by one or more processors 204 of a controller 140, cause the controller 140 to perform operations. The operations include receiving engine data regarding operation of the engine 110. The operations also include receiving an enable condition based on the engine data indicating that at least one engine data value of the engine data satisfies a corresponding threshold. The operations also include receiving component data corresponding to a component of the engine, responsive to receiving the enable condition. The operations also include pre-processing the component data by removing a first set of component data values of the component data that correspond to a first set of engine data values of the engine data. The operations also include aggregating the pre-processed component data by grouping a second set of component values of the component data. The operations also include determining a RUL for the component based on a RUL model that correlates at least a portion of the aggregated data to the RUL. The operations also include providing the RUL on a display.

In some embodiments, the at least one engine data value includes at least one of an engine speed value, a fuel consumption rate, or a previously determined RUL value. In some embodiments, the at least one engine data value includes an engine load value, and the corresponding threshold includes at least one of a low-load threshold and a high-load threshold. The engine load value satisfies the corresponding threshold when the engine load value is at or above the low-load threshold, at or below the high-load threshold, or both. In some embodiments, the operations further include receiving a fault code corresponding to the component of the engine and preventing the controller 140 from receiving the enable condition while the fault code is active such that the controller 140 does not receive the component data. In some embodiments, the operations further include receiving a fault code corresponding to a different component of the engine and preventing the controller 140 from receiving the enable condition while the fault code is active such that the controller 140 does not receive the component data. In some embodiments, the operations further comprise adjusting the RUL based on at least one of detecting a service event or determining that one or more component data values of the component data are outside a predetermined range of values.

Figure 4:
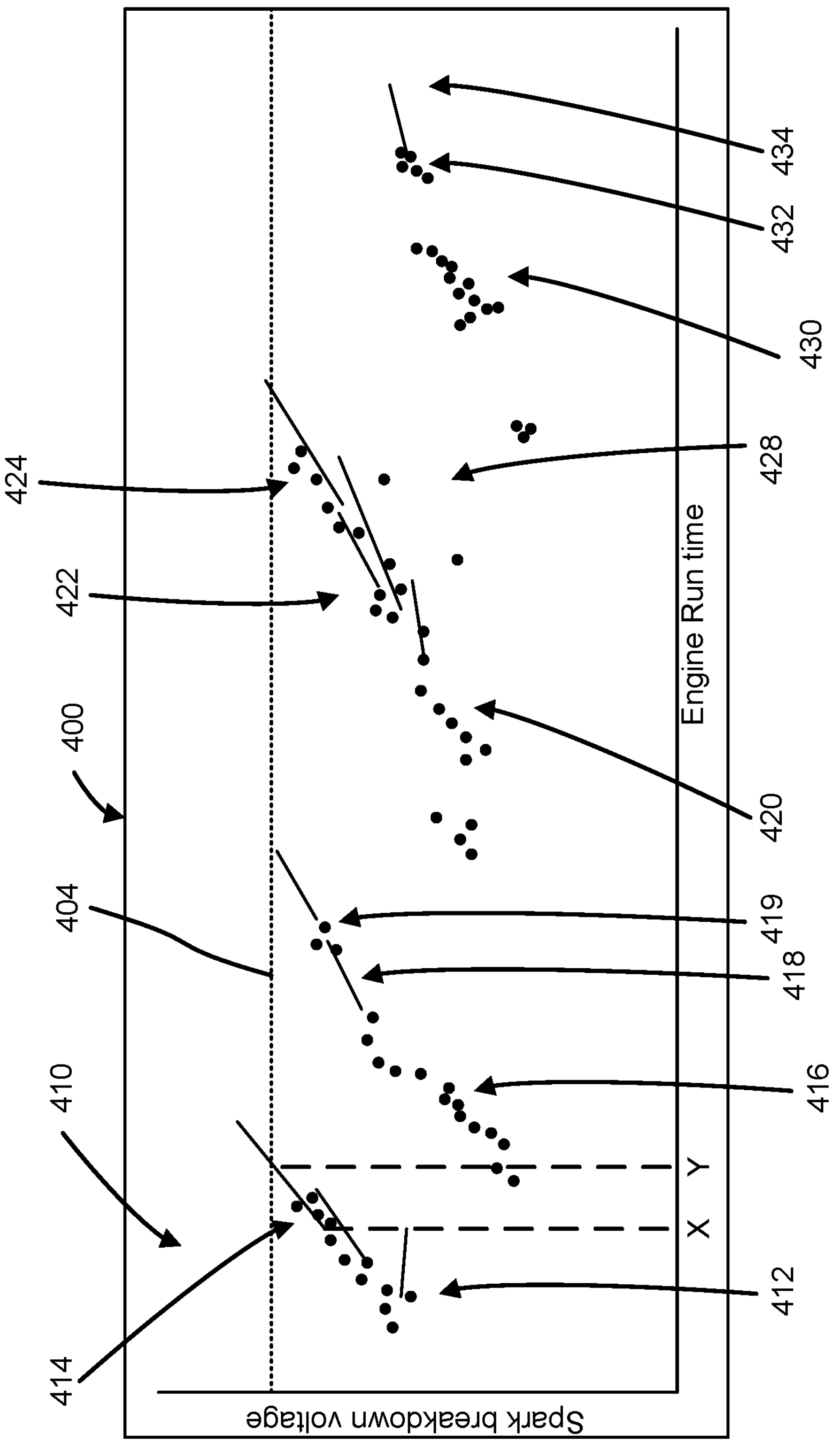
FIG. 4 is a graph depicting a remaining useful life calculation over a time period, according to an example embodiment.

FIG. 4 is a graph 400 depicting breakdown voltage over time. More specifically, the graph 400 depicts predicted breakdown voltages that are used to determine a RUL value for an ignitor 116 over a time of operation of the system 100. A breakdown voltage threshold 404 is shown. The breakdown voltage threshold 404 defines a maximum breakdown voltage for the ignitor 116 (e.g., a component limit). In a first section 410 of the graph 400, a first group of breakdown voltage values 412 are shown. One or more models 414, shown as trend lines, for predicting breakdown voltages may be determined based on the first group of breakdown voltage values 412. The controller 140 (or the edge computing device 220 and/or the remote computing system 222) may provide a notification of a time value that corresponds to when the trend line of the model 414 exceeds the threshold 404. As shown, breakdown voltage increases as the ignitor ages. The RUL may be expressed as a value, such as a number of engine hours and/or as a predicted number of days based on the duty cycle. Advantageously, when an actual spark breakdown voltage value (e.g., a sensed value, or a determined value based on a sensed proxy value) is below threshold 404, the RUL modeling circuit 212 may provide a notification to a user or a user device that indicates the RUL (in terms of engine hours or predicted days). In an example operating scenario, the RUL modeling circuit 212 may provide a notification to a user or a user device that indicates the RUL (in terms of engine hours or predicted days) at a first time value (e.g., a present time), represented by time value "X" in FIG. 4. The time value "X" is a present time value of engine operating hours at which the RUL modeling circuit 212 analyzes the ignitor data using the model. In some embodiments, the RUL modeling circuit 212 may provide a second time value (e.g., the time value when the predicted breakdown voltage value is equal to or greater than the threshold 404), represented by time value "Y" in FIG. 4. The time value "Y" is a future time value of engine operating hours at which the predicted breakdown voltage is expected to be greater than or equal to the threshold 4040. The difference between the second time value and the first time value (e.g., Y minus X) is equivalent to the prognostic benefit provided by the systems and methods described herein. This is also shown on the right side of FIG. 4. Beneficially, the user may use this time period to act on a recommended service plan to service one or more of the ignitors 116 based on the RUL value.

In some embodiments, an error band of the RUL is calculated or determined based on spread of the data points used for the regression fit (e.g., 95% prediction interval, 90% prediction interval, etc.). In some embodiments, the error band may be used while providing notifications to a user or user device. For example, the error band translates into a range of dates (e.g., based on the duty cycle) between which a user is recommended to service the plug.

A second group of breakdown voltage values 416 is shown. The second group of breakdown voltage values 416 correspond to the breakdown voltage of an ignitor 116 after a first service event. As shown, after the first service event, the breakdown voltage decreases. Thus, a sharp or rapid decrease in breakdown voltage may be indicative of a service event. In some embodiments, the controller 140 may determine and/or detect that a service event has occurred based on determining that each ignitor data value of a set of ignitor data values is below a predetermined ignitor data value threshold and/or that each engine data value of a set of engine data values is at or above a predetermined engine data value threshold. The set of ignitor data values correspond to the set of engine data values. For example, third set of ignitor data values and the set of engine data values may have corresponding timestamps. In an example embodiment, the RUL modeling circuit 212 determines that a service event may have taken place based on the rapid decrease in breakdown voltage occurring without a significant decrease in engine load. That is, the set of ignitor data values (e.g., breakdown voltage values) being below the ignitor data value threshold may be indicative of a breakdown voltage decrease. The set of engine data values (e.g., engine load values) being at or above the engine data value threshold may be indicative of non-decreasing engine load conditions.

In some embodiments, responsive to detecting an abrupt decrease in spark voltage without a statistically significant decrease in engine load that is indicative of a service event, the RUL modeling circuit 212 may retrain an existing RUL model and/or generate a new RUL model (i.e., reset the existing model). The decision to retrain the existing RUL model and/or generate the new RUL model after a service event may be based on: (i) accumulating sufficient number of data values (e.g., data points) and/or (ii) accumulating a number of data values above a predetermined threshold of breakdown voltage. The predetermined threshold (e.g., a "predetermined breakdown voltage value threshold" or "value threshold"), above which breakdown voltage values may be used for re-training the model (or generating a new model), may depend on one or more performance metrics of the model. The performance metrics of a model may indicate a confidence level of an accuracy of the mode, such as an R-squared value. For example, after a service event, the resulting trend of breakdown voltage may generate a model with low performance metrics, such as an R-squared value below a predetermined R-squared threshold (e.g., less than 0.9, less than 0.95, etc.). That is, a model trained (or retrained) using breakdown voltage values below the predetermined threshold may result in a performance metric value of the model being below the predetermined performance metric threshold. A model trained (or retrained) using breakdown voltage values at or above the predetermined threshold may result in a performance metric value of the model being at or above the predetermined performance metric threshold.

A third group of breakdown voltage values 418 is shown. In some embodiments, the third group of breakdown voltage values 418 correspond to the breakdown voltage of an ignitor 116 after the first service event and after enough data has been received to generate an updated model 419. In other embodiments, the third group of breakdown voltage values 418 correspond to the breakdown voltage of an ignitor 116 after the first service event and after accumulating a number of data values above a predetermined threshold of breakdown voltage such that the trained model meets predefined performance metrics.

A fourth group of breakdown voltage values 420 is shown. The fourth group of breakdown voltage values 420 correspond to the breakdown voltage of an ignitor 116 after a second service event.

A fifth group of breakdown voltage values 422 is shown. In some embodiments, the fifth group of breakdown voltage values 422 correspond to the breakdown voltage of an ignitor 116 after the second service event and after enough data has been received to generate an updated model 424. In other embodiments, the fifth group of breakdown voltage values 422 correspond to the breakdown voltage of an ignitor 116 after the second service event and after accumulating a number of data values above a predetermined threshold of breakdown voltage such that the trained model meets predefined performance metrics.

A subset 428 of the fifth group of breakdown voltage values 422 may include breakdown voltage values that correspond to a change in duty cycle. As described above, the RUL modeling circuit 212 may retrain an existing model and/or generate a new model responsive to detecting and/or determining the change in duty cycle. In some embodiments, the change in duty cycle corresponds to low load engine conditions.

A sixth group of breakdown voltage values 430 is shown. The sixth group of breakdown voltage values 430 correspond to the breakdown voltage of an ignitor 116 after a third service event.

A seventh group of breakdown voltage values 432 is shown. In some embodiments, the seventh group of breakdown voltage values 432 correspond to the breakdown voltage of an ignitor 116 after the third service event and after enough data has been received to generate an updated model 434. In other embodiments, the seventh group of breakdown voltage values 432 correspond to the breakdown voltage of an ignitor 116 after the third service event and after accumulating a number of data values above a predetermined threshold such that the trained model meets predefined performance metrics.

Advantageously, the system and methods described herein enable a computing system (e.g., the controller 140, the edge computing device 220, and/or the remote computing system 222) to determine a remaining useful life of an ignitor 116. As described herein, in some embodiments, determining the RUL of an ignitor 116 may include: receiving enable conditions, pre-processing data, aggregating data, determining the RUL value based on a model and RUL adjustments. In some embodiments, responsive to determining the RUL value, the RUL value may be provided to a user device.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the aftertreatment control circuit may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices.

While the term "processor" is briefly defined above, the term "processor" and "processing circuit" are meant to be broadly interpreted. In some embodiments, the one or more processors may be external to the apparatus (e.g., on-board vehicle controller), for example the one or more processors may be or included with a remote processor (e.g., a cloud-based processor). In this regard, a given circuit or components thereof may be disposed locally (e.g., as part of a local server, a local computing system, etc.) or remotely (e.g., as part of a remote server such as a cloud-based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object-oriented programming language such as Java, Smalltalk, C++ or the like and conventional procedural programming languages, such as the "C" programming language or similar programming languages. The computer readable program code may execute entirely on a local computer, partly on the local computer, as a stand-alone computer-readable package, partly on the local computer and partly on a remote computer, etc. In the latter scenario, the remote computer may be connected to the local computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the apparatus and system as shown in the various exemplary embodiments is illustrative only. Additionally, any element disclosed in one embodiment may be incorporated or utilized with any other embodiment disclosed herein.

What is claimed is:

1. A method for determining a remaining useful life (RUL) of a component of an engine system, the method comprising:

receiving, by at least one processing circuit, component data comprising sensor data corresponding to the component and engine data corresponding to an engine of the engine system;

pre-processing, by the at least one processing circuit, the component data by removing a first set of sensor data values of the sensor data that correspond to a first set of engine data values of the engine data;

aggregating, by the at least one processing circuit, the pre-processed component data by grouping a second set of sensor values of the sensor data based on time stamps corresponding to (i) each sensor value of the second set of sensor values and (ii) each engine data value of a second set of engine data values of the engine data;

determining, by the at least one processing circuit, the RUL for the component based on a RUL model that correlates at least a portion of the aggregated data to the RUL;

adjusting, by the at least one processing circuit, the RUL based on at least one of detecting a service event or determining that one or more sensor data values of the sensor data are outside a predetermined range of values; and providing the RUL on a display.

2. The method of claim 1, wherein pre-processing the component data further comprises transforming the component data from a non-standardized format into a standardized format.

3. The method of claim 1, wherein the first set of engine data values of the engine data are less than or equal to a low load threshold values.

4. The method of claim 3, wherein aggregating the pre-processed data comprises determining, by the at least one processing circuit, a dynamic threshold based on a second set of engine values that are greater than a predetermined threshold value.

5. The method of claim 4, further comprising determining the RUL based on a third set of sensor values that correspond to a third set of engine data values that are greater than or equal to the dynamic threshold.

6. The method of claim 1, wherein the component is an ignitor.

7. The method of claim 1, wherein the one or more sensor data values of the sensor data correspond to a duty cycle such that determining that the one or more sensor data values of the sensor data are outside the predetermined range of values is indicative of a duty cycle change.

8. A system comprising:

a controller coupled to an engine having one or more ignitors, the controller having one or more processors and one or more memory devices, the one or more memory devices storing instructions that, when executed by the one or more processors, cause the controller to perform operations comprising:

receiving, from one or more sensors coupled to the controller, ignitor data regarding the one or more ignitors and engine data regarding the engine;

pre-processing the ignitor data by removing a first set of ignitor data values of the ignitor data, the first set of ignitor data values corresponding to a first set of engine data values of the engine data;

aggregating the pre-processed ignitor data by grouping a second set of ignitor data values of the ignitor data;

determining a remaining useful life (RUL) value for each of the one or more ignitors based on the second set of ignitor data values and a model;

adjusting the RUL based on detecting a service event, wherein detecting the service event comprises determining that each ignitor data value of a third set of ignitor data values is below a predetermined ignitor data value threshold and that each engine data value of a third set of engine data values is at or above a predetermined engine data value threshold, the third set of ignitor data values corresponding to the third set of engine data values; and providing the RUL on a display.

9. The system of claim 8, wherein the instructions, when executed by the one or more processors, further cause the controller to perform operations comprising retraining the model based on receiving new ignitor data, the new ignitor data comprising at least one of:

a fourth set of ignitor data values, wherein a first quantity of data values in the fourth set of ignitor data values is at or above a first quantity threshold, or a fifth set of ignitor data values, wherein a second quantity of data values in the fifth set of ignitor data values is at or above a second quantity threshold and each data value in the fifth set of ignitor data values is greater than a value threshold.

10. The system of claim 8, wherein the instructions, when executed by the one or more processors, further cause the controller to perform operations comprising retraining the model based on determining that a fourth set of ignitor data values are outside a predetermined range, the fourth set of ignitor data values corresponding to a third time period after a second time period corresponding to the second set of ignitor data values.

11. The system of claim 8, wherein instructions, when executed by the one or more processors, further cause the controller to perform operations comprising retraining the model based on determining that a difference between a regression value of the model and a nominal regression value is greater than a predetermined threshold.

12. The system of claim 8, wherein the engine data comprises a fault code occurring during a third time period;

wherein pre-processing the ignitor data further includes removing a fourth set of ignitor data values from the ignitor data, the fourth set of ignitor data values corresponding to the third time period.

13. A non-transitory computer readable media storing instructions that, when executed by one or more processors of a controller, cause the controller to perform operations comprising:

receiving engine data regarding operation of an engine;

receiving an enable condition based on the engine data indicating that at least one engine data value of the engine data satisfies a corresponding threshold, wherein the at least one engine data value comprises an engine load value and the corresponding threshold includes at least one of a low-load threshold and a high-load threshold, the engine load value satisfying the corresponding threshold when the engine load value is at or above the low-load threshold, at or below the high-load threshold, or both;

receiving component data corresponding to a component responsive to receiving the enable condition;

pre-processing the component data by removing a first set of component data values of the component data that correspond to a first set of engine data values of the engine data;

aggregating the pre-processed component data by grouping a second set of component values of the component data;

determining a remaining useful life (RUL) for the component based on a RUL model that correlates at least a portion of the aggregated data to the RUL; and providing the RUL to on a display.

14. The non-transitory computer readable media of claim 13, wherein the at least one engine data value comprises at least one of:

an engine speed value, a fuel consumption rate, or a previously determined RUL value.

15. The non-transitory computer readable media of claim 13, wherein the operations further comprise:

receiving a fault code corresponding to the component; and preventing the controller from receiving the enable condition while the fault code is active such that the controller does not receive the component data.

16. The non-transitory computer readable media of claim 13, wherein the operations further comprise:

receiving a fault code corresponding to a different component relative to the component; and preventing the controller from receiving the enable condition while the fault code is active such that the controller does not receive the component data.

17. The non-transitory computer readable media of claim 13, wherein the operations further comprise adjusting the RUL based on at least one of detecting a service event or determining that one or more component data values of the component data are outside a predetermined range of values.

* * * * *